US012622772B2

(12) United States Patent
Van Dijk

(10) Patent No.: US 12,622,772 B2
(45) Date of Patent: May 12, 2026

(54) MOUTHPIECE FOR A DENTAL CLEANING DEVICE, METHOD OF BRUSHING TEETH, AND DENTAL CLEANING DEVICE COMPRISING THE MOUTHPIECE

(71) Applicant: DENTAL ROBOTICS GROUP B.V., Delft (NL)

(72) Inventor: Joppe Gideon Van Dijk, Rotterdam (NL)

(73) Assignee: Dental Robotics Group B.V., Delft (NL)

( * ) Notice: Subject to any disclaimer, the term of this patent is extended or adjusted under 35 U.S.C. 154(b) by 696 days.

(21) Appl. No.: 17/512,114

(22) Filed: Oct. 27, 2021

(65) Prior Publication Data

US 2022/0047366 A1     Feb. 17, 2022

Related U.S. Application Data

(63) Continuation of application No. 16/608,164, filed as application No. PCT/NL2018/050276 on Apr. 26, 2018, now Pat. No. 11,191,624.

(30) Foreign Application Priority Data

Apr. 26, 2017    (NL) .................................... 2018786

(51) Int. Cl.
*A61C 17/22*     (2006.01)
*A46B 5/00*      (2006.01)
        (Continued)

(52) U.S. Cl.
CPC .......... *A61C 17/228* (2013.01); *A46B 5/0012* (2013.01); *A46B 9/045* (2013.01);
        (Continued)

(58) Field of Classification Search
CPC ... A61C 17/228; A61C 17/222; A61C 17/227; A61C 17/38; A46B 9/045
See application file for complete search history.

(56) References Cited

U.S. PATENT DOCUMENTS 3,731,675 A * 5/1973 Kelly ................. A61C 17/0211
                                        601/164
4,223,417 A * 9/1980 Solow .................... A46B 9/045
                                        15/22.1
(Continued)

FOREIGN PATENT DOCUMENTS

| CN | 102573561 | 7/2012 |
|---|---|---|
| DE | 20309088 | 9/2003 |

(Continued)

OTHER PUBLICATIONS

EPO Office Action dated Dec. 10, 2020, for European Application No. 18724996.6.

(Continued)

*Primary Examiner* — Marc Carlson

(57) ABSTRACT

A mouthpiece for a dental cleaning device comprises a supporting structure configured to encompass a plurality of teeth of a dental arch. The supporting structure has an inner surface facing a tooth surface. At least one brushing chamber is provided at the inner surface side. The brushing chamber comprises a flexible wall part being deformable by pressurizing or depressurizing the brushing chamber. Bristles extend externally from the flexible wall part. In a method of brushing teeth, a plurality of teeth is encompassed by the mouthpiece, and the at least one brushing chamber is alternatingly pressurized and depressurized.

2 Claims, 13 Drawing Sheets

(51) Int. Cl.

| | |
|---|---|
| *A46B 9/04* | (2006.01) |
| *A46B 15/00* | (2006.01) |
| *A61C 17/02* | (2006.01) |
| *A61C 17/36* | (2006.01) |
| *A61C 17/38* | (2006.01) |

(52) U.S. Cl.
CPC .......... *A46B 15/0051* (2013.01); *A61C 17/22* (2013.01); *A61C 17/222* (2013.01); *A61C 17/227* (2013.01); *A61C 17/36* (2013.01); *A61C 17/38* (2013.01); *A46B 2200/1066* (2013.01); *A61C 17/0211* (2013.01)

(56) References Cited

U.S. PATENT DOCUMENTS

| | | | | |
|---|---|---|---|---|
| 4,224,710 | A * | 9/1980 | Solow | A61C 17/228 |
| | | | | 15/22.1 |
| 4,795,347 | A * | 1/1989 | Maurer | A61C 17/38 |
| | | | | 15/22.1 |
| 5,327,608 | A * | 7/1994 | Kosakewich | A46B 7/02 |
| | | | | 15/22.1 |
| 5,365,624 | A * | 11/1994 | Berns | A61C 17/028 |
| | | | | 601/129 |
| 8,359,692 | B2 | 1/2013 | Brewer | |
| 8,677,541 | B2 | 3/2014 | Meadows et al. | |
| 8,745,802 | B2 * | 6/2014 | Steur | A61C 17/349 |
| | | | | 15/22.1 |
| 9,277,980 | B2 * | 3/2016 | Leveling | A61C 17/228 |
| 9,358,087 | B2 | 6/2016 | Miller et al. | |
| 9,504,542 | B2 | 11/2016 | De Gentile | |
| 9,526,597 | B2 | 12/2016 | Steur | |
| 9,848,959 | B2 | 12/2017 | Lowe et al. | |
| 10,143,296 | B2 | 12/2018 | Yoo | |
| 10,413,050 | B2 * | 9/2019 | Pierce | A61C 17/222 |
| 10,413,389 | B2 * | 9/2019 | Pierce | A61C 17/224 |
| 10,420,633 | B2 * | 9/2019 | Pierce | A61C 17/224 |
| 10,869,541 | B2 | 12/2020 | Pai et al. | |
| 11,191,624 | B2 * | 12/2021 | Van Dijk | A61C 17/36 |
| 2002/0157202 | A1 * | 10/2002 | Hartel | A46B 9/045 |
| | | | | 15/167.2 |
| 2009/0208898 | A1 * | 8/2009 | Kaplan | A46B 9/045 |
| | | | | 433/80 |
| 2009/0276972 | A1 * | 11/2009 | Dugan | A61C 17/349 |
| | | | | 15/167.2 |
| 2010/0062397 | A1 * | 3/2010 | Brewer | A61C 17/228 |
| | | | | 15/22.1 |
| 2011/0027758 | A1 * | 2/2011 | Ochs | A61C 17/028 |
| | | | | 433/215 |
| 2011/0072605 | A1 | 3/2011 | Steur | |
| 2011/0154595 | A1 * | 6/2011 | Hill | A46B 9/045 |
| | | | | 15/167.2 |
| 2012/0077143 | A1 * | 3/2012 | Fougere | A61C 17/0202 |
| | | | | 433/82 |
| 2012/0189976 | A1 * | 7/2012 | Mcdonough | A61C 17/0211 |
| | | | | 433/89 |
| 2013/0055513 | A1 * | 3/2013 | Meadows | A61C 17/0211 |
| | | | | 15/21.1 |
| 2014/0011159 | A1 * | 1/2014 | Miller | A61C 17/3481 |
| | | | | 433/103 |
| 2014/0272761 | A1 * | 9/2014 | Lowe | A61C 17/3481 |
| | | | | 433/2 |
| 2015/0024340 | A1 * | 1/2015 | De Gentile | A61C 17/0211 |
| | | | | 433/82 |
| 2016/0270892 | A1 * | 9/2016 | Yoo | A61C 17/22 |
| 2016/0338810 | A1 * | 11/2016 | Schmalhurst | A61C 17/221 |
| 2018/0098619 | A1 * | 4/2018 | Pierce | A46B 1/00 |
| 2018/0098833 | A1 * | 4/2018 | Pierce | A61C 17/224 |
| 2018/0184795 | A1 * | 7/2018 | Pai | A46B 15/0038 |
| 2020/0178680 | A1 * | 6/2020 | Van Dijk | A46B 9/04 |

FOREIGN PATENT DOCUMENTS

| | | |
|---|---|---|
| DE | 102005009965 | 12/2006 |
| EP | 0015060 | 9/1980 |
| EP | 0173114 | 3/1986 |
| EP | 2995220 | 3/2016 |
| JP | S61-64245 | 4/1986 |
| JP | 2011523879 | 8/2011 |
| JP | 2013-504393 | 2/2013 |
| JP | 2013050439 | 3/2013 |
| KR | 1020110111436 | 10/2011 |
| WO | 2004/000155 | 12/2003 |
| WO | 2005/094719 | 10/2005 |
| WO | 2007/121760 | 11/2007 |
| WO | 2009/048287 | 4/2009 |
| WO | 2009/150559 | 12/2009 |
| WO | 2010/028383 | 3/2010 |
| WO | 2010/076693 | 7/2010 |
| WO | 2010/076702 | 7/2010 |
| WO | 2012/088193 | 6/2012 |
| WO | 2015/074993 | 5/2015 |
| WO | 2015/145350 | 10/2015 |

OTHER PUBLICATIONS

International Preliminary Search Report on Patentability dated Sep. 9, 2019 for Application No. PCT/NL2018/050276.
International Search Report and Written Opinion dated Jun. 22, 2018 for Application No. PCT/NL2018/050276.
Search Report dated Jan. 16, 2018 for Application No. NL 2018786.

\* cited by examiner

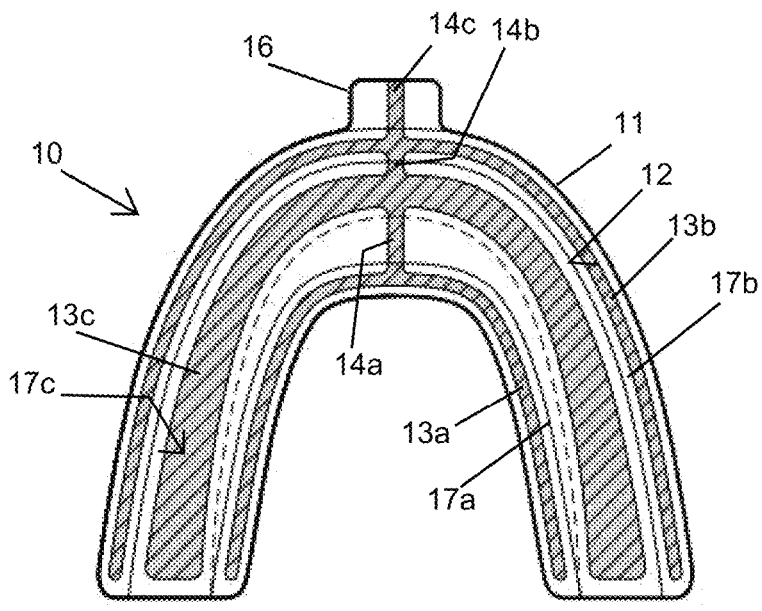
FIG. 1
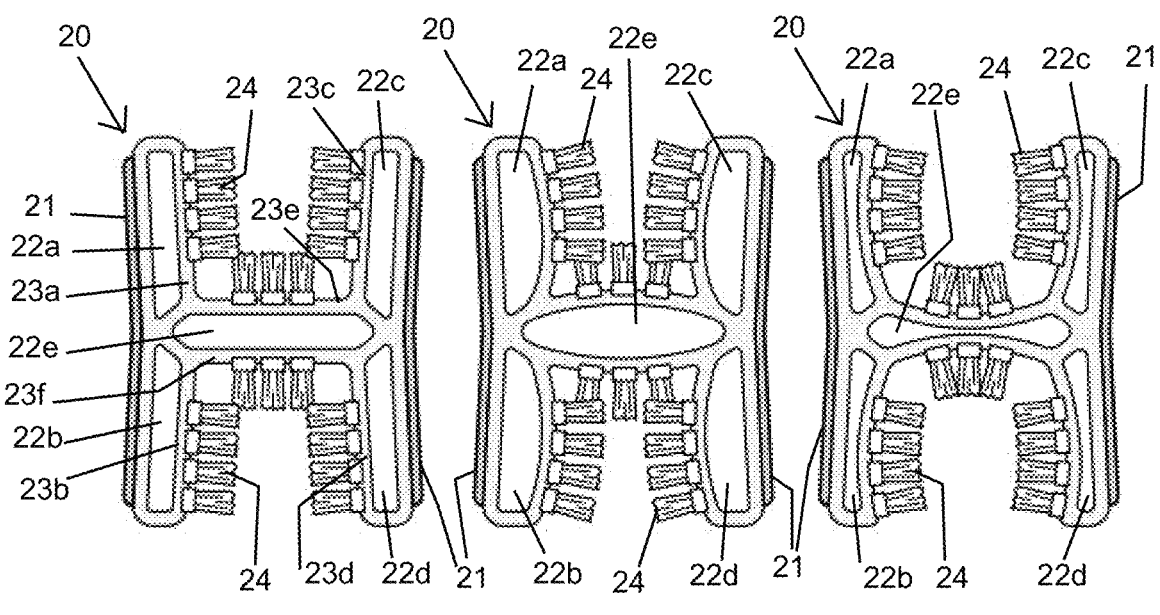
FIG. 2a      FIG. 2b      FIG. 2c

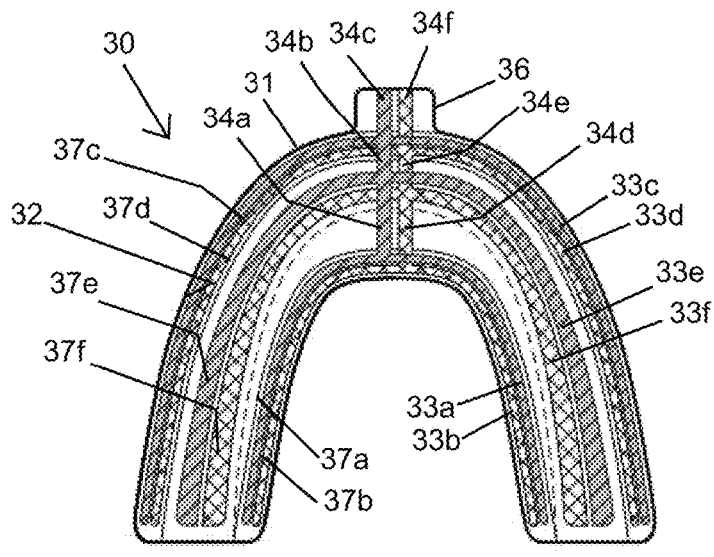
FIG. 3
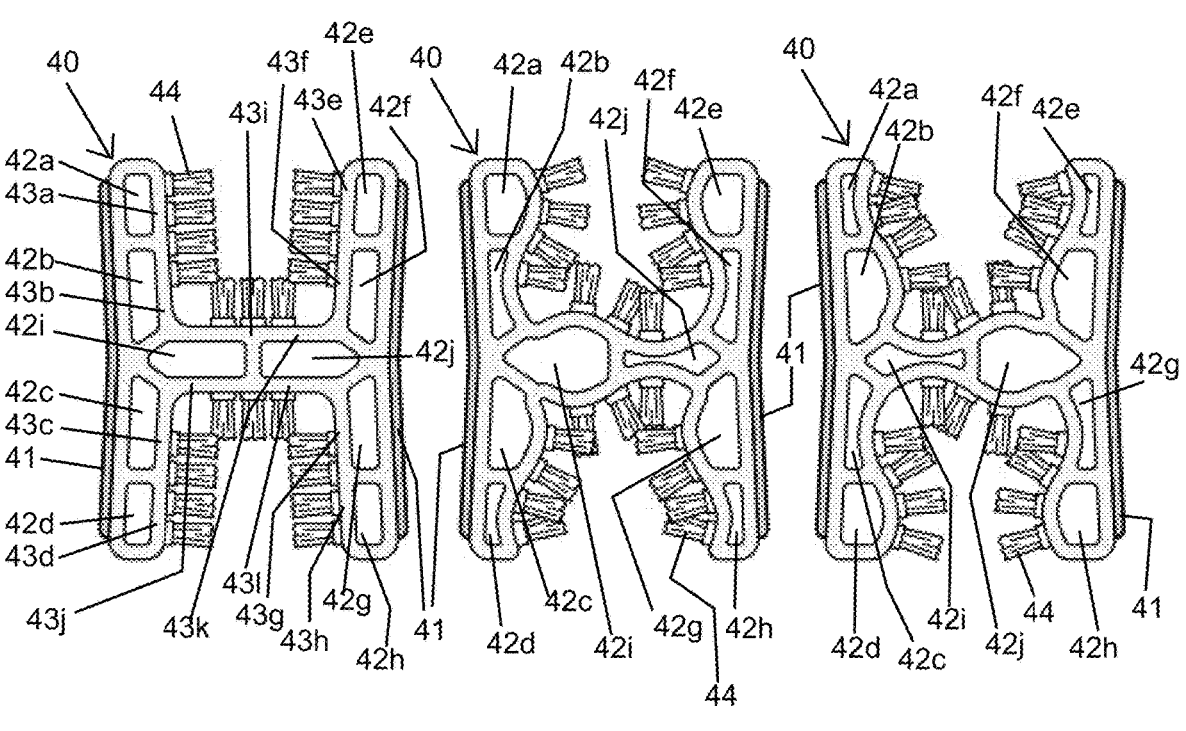
FIG. 4a          FIG. 4b          FIG. 4c

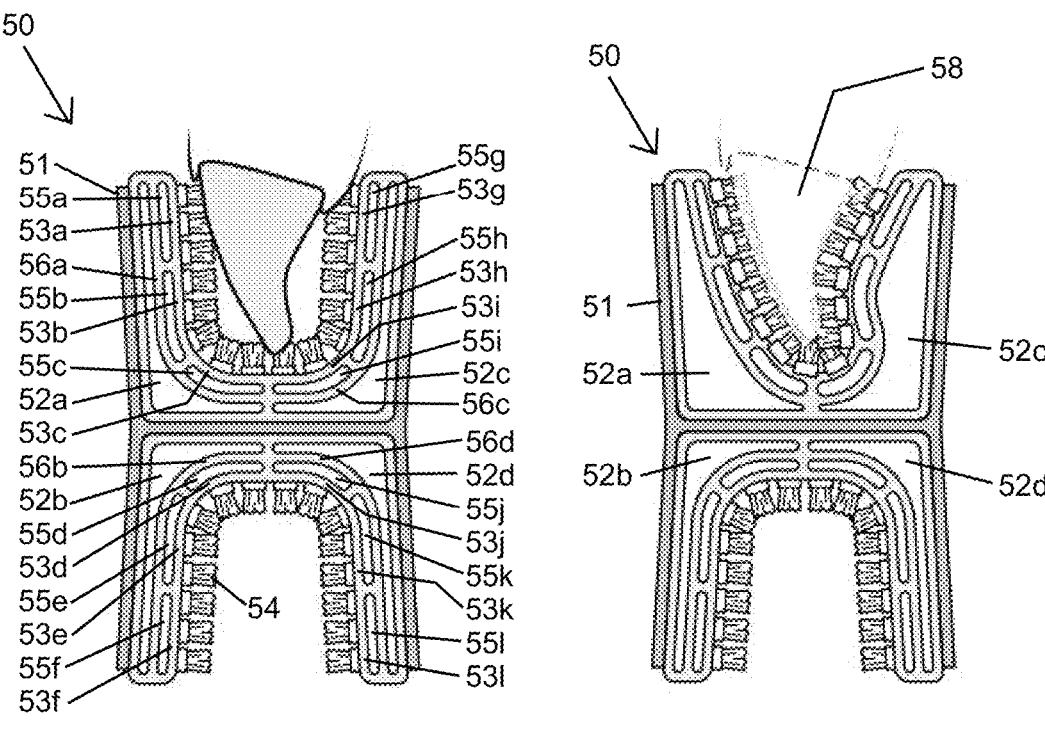
FIG. 7a          FIG. 7b
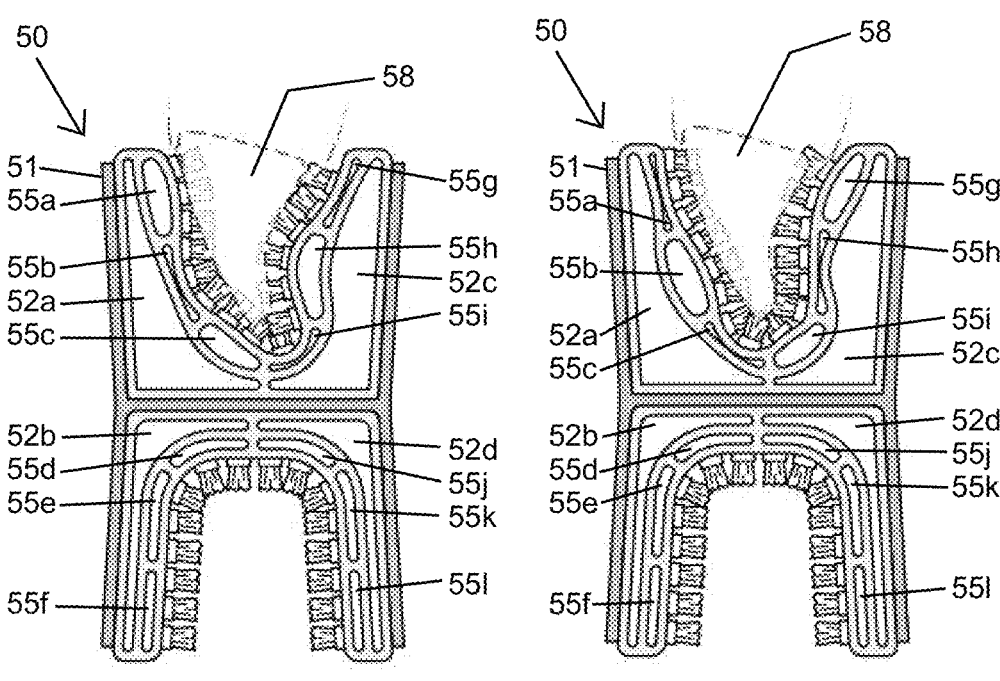
FIG. 7c          FIG. 7d

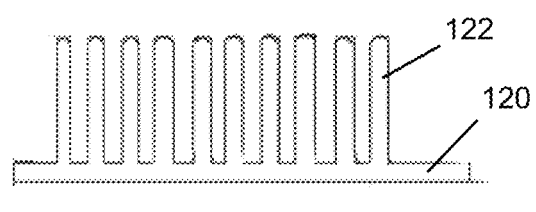
FIG. 14
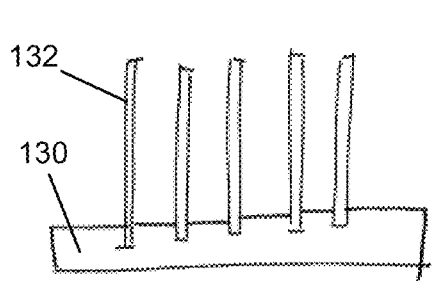
FIG. 15
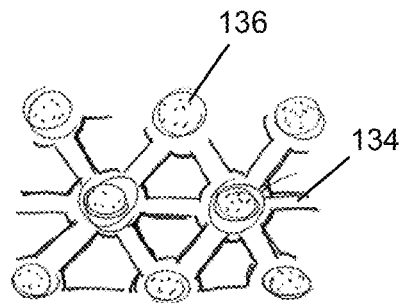
FIG. 15a
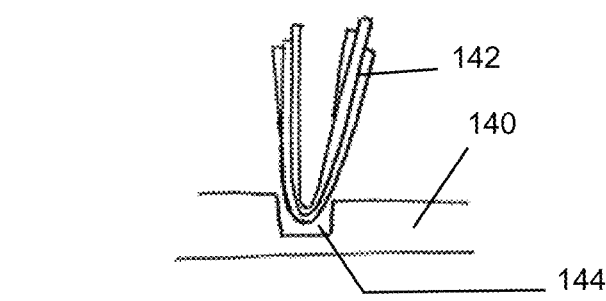
FIG. 16
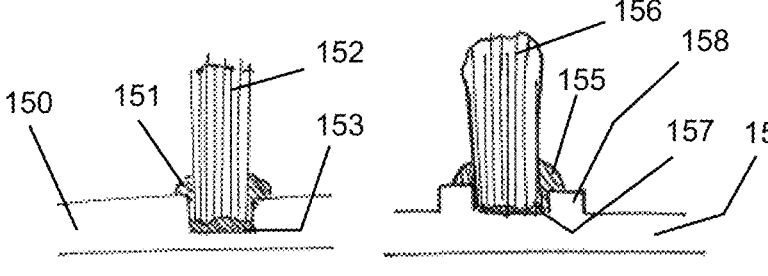
FIG. 17a          FIG. 17b

1

MOUTHPIECE FOR A DENTAL CLEANING DEVICE, METHOD OF BRUSHING TEETH, AND DENTAL CLEANING DEVICE COMPRISING THE MOUTHPIECE

CROSS-REFERENCE TO RELATED APPLICATIONS

The present application is a continuation of U.S. patent application Ser. No. 16/608,164, filed on Oct. 24, 2019, which is a U.S. national stage application under 35 U.S.C. § 371 of PCT Application No. PCT/NL2018/050276, filed on Apr. 26, 2018, which claims priority to Netherlands Patent Application No. 2018786, filed on Apr. 26, 2017, the entireties of which are incorporated herein by reference.

BACKGROUND OF THE INVENTION

The invention relates to the field of dental cleaning devices, in particular to a mouthpiece for a dental cleaning device. The invention further relates to a method of brushing teeth. The invention further relates to a dental cleaning device comprising the mouthpiece of the invention. The mouthpiece may be configured to brush a number of, or all teeth of a human or animal mouth at the same time.

Cleaning of teeth of humans and animals is a prerequisite for oral health, and health of internal organs. Various dental cleaning devices are available, such as manual and powered toothbrushes. With these typical toothbrushes, it is advised to brush the teeth by a prescribed method for at least two minutes per day to effectively remove plaque. Yet, an average person does not spend all of the prescribed time cleaning his or her teeth, and does not always brush according to an effective method. Additionally, for elderly or disabled persons or children it can be difficult to brush the teeth with a toothbrush, since typical toothbrushes require precise positioning of the brush bristles on various surfaces of the teeth. Additionally, persons may exert too much pressure on brush bristles during brushing the teeth, whereby not only the bristles wear rapidly and excessively, but also the brushing process is not effective, teeth may be damaged, and tooth gum may withdraw which has adverse consequences for the dental health.

There is a need to automatically clean the teeth, whereby the time and effort required for effective brushing is reduced. In addition, there is a need to avoid carefully manoeuvring the brush.

Dental cleaning devices are known comprising mouthpieces which cover both the maxillary dental arch and the mandibular dental arch. Such a mouthpiece comprises brushing surfaces with bristles, which are automatically moved, to clean the complete set of teeth.

The mouthpiece and the brushing surfaces of the known dental cleaning devices require adjustment to fit closely to the shape of a user's dental arch. The mouthpiece should be able to clean every tooth surface. However, dental arches vary greatly among different users due to varying sizes of the dental arch, malocclusion, missing teeth, and the like. So, there is a need for a dental cleaning device with an adjustable mouthpiece.

Reference US 2010/0062397 A1 discloses an electric dental cleaning device with a mouthpiece. This known mouthpiece has an upper part for cleaning the maxillary/upper arch of the teeth and a lower part for cleaning the mandibular/lower arch of the teeth. Both the upper part and the lower part of this known mouthpiece each have a brush pad, which brush pads each have a U-shaped cross section and bristles on the inside of the U-shape. These two brush pads are positioned with the bottoms of the U-shape of the pads facing towards each other and the legs of the U of the upper brush pad pointing in an upward direction opposite to the legs of the U-shape of the lower brush pad, which point in downward direction. The brush-pads comprise rigid brush plates on the outside of the U-shape. These U-shaped brush pads are driven up and down relative to the free ends/tops of the teeth in the direction of the legs of the U shape. In some embodiments, a bladder may be positioned between the maxillary/upper arch and mandibular/lower arch of the mouthpiece, and alternating or oscillating pneumatic pressure and suction may be applied to the bladder to move upper and lower bottom brush plates, which in turn causes an up and down movement of the U-shaped brush pads, thereby brushing the teeth.

In one embodiment of the mouthpiece according to the reference US 2010/0062397 A1, the mouthpiece is adjustable in that side brush plates are positioned against the lingual and facial side of teeth by the use of flexible fingers and/or bladders which are configured to exert a static pressure to cause the tips of the bristles of the brush plates to engage the lingual and facial side of the teeth whilst moving up and down, transverse to the direction of the static pressure, along the lingual and facial side of the teeth in a direction.

In US 2010/0062397 A1 the brushing movement is only a 1-D-movement (one dimensional movement) as the U-shaped brush pads are only moved towards and away from each other.

The mouthpiece according to US 2010/0062397 A1 has a drawback of a limited brushing action, since the bristles on the brush pads have a limited capability to reach all surfaces of the teeth since they are mounted on rigid plates.

Reference U.S. Pat. No. 4,795,347—which has as corresponding European application, EP-A-0173114—discloses several embodiments of devices for cleaning a tooth, which can be divided in two types of devices each intended for encompassing one tooth at a time for, so to say, cleaning one tooth at a time. The device of the first type, shown in FIGS. 1-9 of U.S. Pat. No. 4,795,347, ensures a static brushing pressure of the bristles on the tooth whilst the brushing movement of the bristles is caused by hand, i.e., the brush head is mounted on a handgrip which is manipulated to move the brush head like a regular toothbrush along the tooth. In this first type one single pressure chamber or two opposing pressure bubbles may be used to ensure that the cleaning contact pressure between the individual bristle tufts and the tooth is at least approximately equal all over. Whilst in the first type the brushing movement of the tufts is to be caused by hand, the brushing movement of the device according to the second type is automated by a drive. The device of the second type, shown in FIGS. 10-21 of U.S. Pat. No. 4,795,347, is designed so that the tufts are driven to perform a 2-D-movement (two-dimensional movement) with respect to the tooth surface. Each tuft is driven to move in a plane perpendicular to the dental arch, i.e., to the tooth cleaned. In a first stage the tufts are moved towards the tooth to press against the tooth, subsequently the tufts are moved along the tooth surface in a direction from the gum in tooth-axial direction towards the top/crown of the tooth, followed by moving the tufts away from the tooth to lower the pressure and moving the tufts back from the top/crown towards the gum of the tooth for starting the next cycle. In this second type, pressure bubbles may be used to drive the tufts to perform this 2-D-movement. In these embodiments the tufts are mounted on rigid cleaning element carriers onto which the pressure bubbles act directly or indirectly via rocker arms.

The automated mouthpiece according to U.S. Pat. No. 4,795,347 A1 has as drawback a limited brushing action, since the tufts have a limited capability to reach all surfaces of the tooth since they are mounted on rigid carriers. A further disadvantage of this mouthpiece is that only one tooth at a time is cleaned in automated manner and that for cleaning all teeth the automated mouthpiece of U.S. Pat. No. 4,795,347 has to be moved manually along all teeth, which is time consuming and involves the risk that not all teeth are cleaned sufficiently well.

Thus, there remains a need for an automatic dental cleaning device which is fast and thorough in cleaning multiple teeth simultaneously. Also, a need remains for an automatic dental cleaning device which requires as little effort from the user as possible. Also, a need remains for an automatic dental cleaning device which effectively reaches substantially all tooth surfaces. Also, a need remains for an automatic dental cleaning device which ensures good and sufficient cleaning of the teeth cleaned.

SUMMARY OF THE INVENTION

It would be desirable to provide an alternative mouthpiece for a dental cleaning device, in particular an automatic dental cleaning device. It would also be desirable to provide an improved mouthpiece for a dental cleaning device. It would further be desirable to provide a dental cleaning device provided with the mouthpiece.

To better address one or more of these concerns, in a first aspect of the invention a mouthpiece is provided. The mouthpiece comprises: a supporting structure configured to encompass a plurality of teeth of a dental arch, the supporting structure having an inner surface configured to face a tooth surface; at least one brushing chamber provided at the inner surface side of the supporting structure, wherein the at least one brushing chamber comprises a flexible wall part, wherein the flexible wall part is deformable by pressurizing or depressurizing the brushing chamber; and bristles extending externally from the flexible wall part of the brushing chamber.

In the mouthpiece of the invention, the flexible wall part forms a basis for the bristles. The mouthpiece of the invention has bristles directly connected to the flexible wall part of the brushing chamber, such that the orientation of each bristle or tuft of bristles, i.e., the (general) longitudinal direction of the bristle or tuft of bristles in space, is determined by an orientation of the portion of the flexible wall part to which the bristle or tuft of bristles is connected or attached. This shape, in turn, is determined to an extent of pressurization or depressurization of the brushing chamber. Thus, by varying the pressure in the brushing chamber over time, the orientation of the bristles, or tufts of bristles, is varied over time. With an appropriate design of a brushing chamber, or a plurality of brushing chambers, which plurality of brushing chambers can have mutually different pressurizing and depressurizing cycles, appropriate and effective brushing actions of the bristles or tufts of bristles on teeth can be accomplished. The flexible wall part of the brushing chamber allows the bristles, or tufts of bristles, to better reach essentially the whole surface of teeth, including interdental surfaces, also in case one or more teeth are missing.

According to a more specific embodiment of the first aspect, the invention provides a mouthpiece—according to claim 1—for encompassing a plurality of teeth to be brushed in an upper and lower dental arch. The upper and lower dental arch each have a teeth surface comprising: a lingual surface, a facial surface, and occlusal surface of the molars and incisal edge of the incisors, wherein the lingual surface faces a tongue of the user, the facial surface faces a face of the user and the occlusal surface and incisal edge of the upper dental arch faces the occlusal surface respectively incisal edge of the lower dental arch of the user. The mouthpiece comprises a support structure configured to encompass a plurality of teeth of the dental arch and has an inner surface configured to face the teeth surface of the teeth to be brushed.

The mouthpiece furthermore comprises at least one brushing chamber provided at the side of the inner surface of the supporting structure. The at least one brushing chamber comprises a flexible wall part having an outer side facing away from the brushing chamber. The at least one brushing chamber is configured to face with the outer side of its flexible wall part: the lingual surface and the facial surface and occlusal surface and incisal edge of the teeth to be brushed in the upper and lower dental arch. The mouthpiece furthermore comprises bristles provided on and extending from the outer side of the flexible wall part to the teeth surface. The flexible wall part of the at least one brushing chamber is configured to be deformable by alternatingly pressurizing and depressurizing a fluid in the at least one brushing chamber. This all means that the bristles on the flexible wall part can reach simultaneously all encompassed teeth of the upper and lower dental arch and associated tooth gum or, in case of missing teeth, the tooth gum associated to the gap where the tooth or teeth used to be.

According to a further embodiment of the first aspect of the invention, the mouthpiece furthermore comprises at least one fluid opening in fluid communication with the at least one brushing chamber and configured to allow, alternatingly, supply of fluid to the at least one brushing chamber and discharge of fluid from the at least one brushing chamber for, alternatingly, pressurizing and depressurizing the fluid in the at least one the brushing chamber.

According to another further embodiment of the first aspect of the invention, the flexible wall part is made from an elastic material. The flexible wall part being elastic assists the flexible wall part in returning when depressurizing.

According to another further embodiment of the first aspect of the invention, the bristles (or tufts with bristles) are directly connected to the flexible wall part of the at least one brushing chamber. With the 'bristles being directly connected to the brushing chamber' is meant that from a mechanical point of view there are no intermediate components between the bristles (or tufts) and the brushing chamber which prevent the bristles (or tufts) from following the orientation of the flexible wall part directly adjacent the respective bristle (or tuft), or in other words 'the bristles are directly connected to the flexible wall part of the at least one brushing chamber such that the longitudinal direction of each bristle or tuft of bristles is determined by an orientation of the portion of the flexible and deformable wall part to which the bristle or tuft of bristles is connected or attached'.

According to a further embodiment of the first aspect of the invention, the bristles are configured to engage at least one of the lingual surface, facial surface, and occlusal surface or incisal edge of the upper or lower dental arch when the at least one brushing chamber is pressurized.

In order to avoid access length of the support structure, it is according to a further embodiment of the first aspect of the invention envisaged that the at least one brushing chamber extends, viewed in the length direction of the upper and lower dental arch, all along the length of the support structure. Access length of the support structure would cause unnecessary nuisance for the user.

According to a further embodiment of the first aspect of the invention, the at least one brushing chamber is config-ured to extend, in use when encompassing a plurality of teeth of an upper and lower dental arch and viewed in length direction of the upper and lower dental arch, along a left part, a front part and a right part of the upper and lower dental arch. This allows to encompass all teeth and clean in one go all teeth and associated tooth gum or, in case of missing teeth, the tooth gum associated to the gap where the tooth or teeth used to be.

Taking into account that elderly people are frequently missing all their natural molars, it is envisaged that in the mouthpiece according to the first aspect of the invention, the brushing chamber is configured to encompass at least the incisors, canines, and premolars of the upper and lower dental arch.

According to a further embodiment of the first aspect of the invention, the support structure is rigid relative to the flexible wall part of the at least one brushing chamber. This in order to ensure that, when pressurizing the at least one brushing chamber, this pressurizing does not result in an excessive increase of the brushing chamber in a direction not effective for cleaning of teeth. This excessive increase would result in a 'widening' of the mouthpiece inside the mouth of the user and that not all pressure resulting from pressurizing is focused on the teeth. Such a widening would be felt as unpleasant by the user and the excessive increase of the at least one brushing chambers would result in more fluid and energy being required for the pressurizing.

According to a further embodiment of the first aspect of the invention, the mouthpiece is configured to pressurize one or more of said at least one pressure chamber whilst depres-surizing one or more other of said at least one pressure chamber. In other words, in case of a plurality of brushing chambers, these brushing chambers might be operated to pressurize and depressurize at different moments in time or out of phase with respect to each other.

According to a further embodiment of the first aspect of the invention, the bristles are attached to the flexible wall part of the at least one brushing chamber.

In a second aspect of the invention, a method of brushing teeth is provided, which method comprises the steps of: encompassing a plurality of teeth to be brushed with a mouthpiece according to the first aspect of the invention; and alternatingly pressurizing and depressurizing said at least one brushing chamber.

Worded differently, in a second aspect of the invention, a method of brushing teeth is provided, the brushing method comprising:

encompassing a plurality of teeth of a dental arch by a mouthpiece comprising a supporting structure having an inner surface facing a tooth surface;

pressurizing and depressurizing at least one brushing chamber provided at the inner surface side of the supporting structure, wherein the at least one brushing chamber comprises a flexible wall part with bristles extending externally from the flexible wall part of the brushing chamber.

In a third aspect of the invention, a dental cleaning device is provided. The dental cleaning device comprises a mouth-piece according to the invention.

According to a further embodiment of the third aspect of the invention, the dental cleaning device further comprises a pressure device configured to be in fluid communication with the at least one brushing chamber and configured for alternatingly pressurizing and depressurizing the at least one brushing chamber with a fluid.

According to a further embodiment of the third aspect of the invention, the dental cleaning device further comprises an interface having a first interface part with at least one first fluid terminal in fluid communication with the at least one brushing chamber, and a second interface part with at least one second fluid terminal in fluid communication with the pressure device, wherein the first interface part and second interface part are configured for being detachably coupled to each other such that, in coupled condition, said at least one first fluid terminal is in fluid communication with said at least one second fluid terminal.

According to a further embodiment of the third aspect of the invention, the number of said at least one first fluid terminals corresponds with the number of said at least one second fluid terminals.

According to a further embodiment of the third aspect of the invention, the pressure device is furthermore configured to pressurize one or more of said at least one pressure chamber whilst depressurizing one or more other of said at least one pressure chamber.

In yet another embodiment, the invention is a mouthpiece for brushing teeth, the mouthpiece having a support struc-ture configured to receive a plurality of teeth of a dental arch, the support structure having a first inner surface facing the plurality of teeth. The mouthpiece further has a first brushing chamber coupled to the first inner surface of the support structure, the first brushing chamber having a flexible wall part, the flexible wall part having an outer side opposite the first inner surface of the support structure. The mouthpiece further includes a plurality of tufts of bristles extending from the outer side of the flexible wall part of the first brushing chamber, the plurality of tufts of bristles being separately formed and adhered to the flexible wall part. The flexible wall part of the first brushing chamber is configured to be deformed by alternately pressurizing and depressurizing a fluid in the first brushing chamber.

In a further embodiment, the invention is a mouth piece for brushing teeth, the mouth piece having a support struc-ture configured to receive a plurality of teeth of a dental arch, the support structure having a first side part, a second side part, and an intermediate part connecting the first and second side parts, the first side part having a first inner surface facing an upper dental arch of the plurality of teeth and the second side part having a second inner surface facing a lower dental arch of the plurality of teeth. The mouthpiece further includes a first brushing chamber coupled to the first inner surface of the support structure, the first brushing chamber having a flexible wall part, the flexible wall part having an outer side opposite the first inner surface of the support structure. The mouthpiece has a second brushing chamber coupled to the second inner surface of the support structure, the second brushing chamber having a flexible wall part, the flexible wall part having an outer side opposite the second inner surface of the support structure. The mouthpiece has a plurality of bristles extending from the outer sides of the flexible wall parts of the first and second brushing chambers. The flexible wall parts of the first and second brushing chambers are configured to be deformed by alternately pressurizing and depressurizing a fluid in the first and second brushing chambers.

In yet another embodiment, the invention is a mouthpiece for brushing teeth, the mouthpiece having a support struc-ture configured to receive a plurality of teeth of a dental arch, the support structure having a first inner surface facing the plurality of teeth. A first positioning chamber is coupled to the first inner surface of the support structure. A first brushing chamber is coupled to the first positioning chamber, the first brushing chamber having a flexible wall part, the flexible wall part having an outer side opposite the first inner surface of the support structure. A plurality of bristles extend from the outer side of the flexible wall part of the first brushing chamber. The flexible wall part of the first brushing chamber is configured to be deformed by alternately pressurizing and depressurizing a fluid in the first brushing chamber.

These and other aspects of the invention will be more readily appreciated as the same becomes better understood by reference to the following detailed description and considered in connection with the accompanying drawings in which like reference symbols designate like parts.

BRIEF DESCRIPTION OF THE DRAWINGS

FIG. 1 schematically illustrates a top view, partially in cross-section, of an embodiment of a mouthpiece according to the invention.

FIGS. 2a, 2b and 2c schematically depict cross-sectional views of an embodiment of a mouthpiece according to the invention, in different respective operational states thereof.

FIG. 3 schematically illustrates a top view, partially in cross-section, of a further embodiment of a mouthpiece according to the invention.

FIGS. 4a, 4b and 4c schematically depict cross-sectional views of a further embodiment of a mouthpiece according to the invention, in different respective operational states thereof.

FIGS. 7a, 7b, 7c and 7d schematically depict cross-sectional views of a further embodiment of a mouthpiece according to the invention comprising a positioning chamber and a brushing chamber, in different respective operational states thereof.

FIG. 8 schematically depicts a cross-sectional view of an embodiment of a brushing chamber comprising a bladder.

FIG. 9 schematically depicts a cross-sectional view of a further embodiment of a mouthpiece according to the invention comprising brushing chambers each comprising a bladder.

FIG. 10a schematically depicts a cross-sectional view of an embodiment of a brushing chamber.

FIGS. 10b, 10c and 10d schematically depict cross-sectional views of a further embodiment of a mouthpiece according to the invention comprising brushing chambers constructed similarly to the brushing chamber of FIG. 10a.

FIGS. 11, 12 and 13 schematically depict cross-sectional views of different respective further embodiments of brushing chambers.

FIG. 14 schematically depicts a cross-sectional view of a flexible wall part of a brushing chamber, the flexible wall part having integral bristles.

FIG. 15 schematically depicts a cross-sectional view of a flexible wall part of a brushing chamber, the flexible wall part having bristles implanted therein.

FIG. 15a schematically depicts a top view of an embodiment of a bristle support having bristles implanted therein.

FIG. 16 schematically depicts a cross-sectional view of a flexible wall part of a brushing chamber, the flexible wall part having a recess for accommodating a tuft of bristles.

FIGS. 17a and 17b schematically depict cross-sectional views of a flexible wall part of a brushing chamber, the flexible wall part having a tuft of bristles glued to it.

FIGS. 28a and 26b schematically depict, in a cross-sectional view and a top view, respectively, a first embodiment of a cleaning fluid arrangement in a mouthpiece.

FIGS. 29a and 29b schematically depict, in a cross-sectional view and a top view, respectively, a second embodiment of a cleaning fluid arrangement in a mouthpiece.

FIGS. 30a and 30b schematically depict, in a cross-sectional view and a top view, respectively, a third embodiment of a cleaning fluid arrangement in a mouthpiece.

DETAILED DESCRIPTION OF EMBODIMENTS

Figure 31:
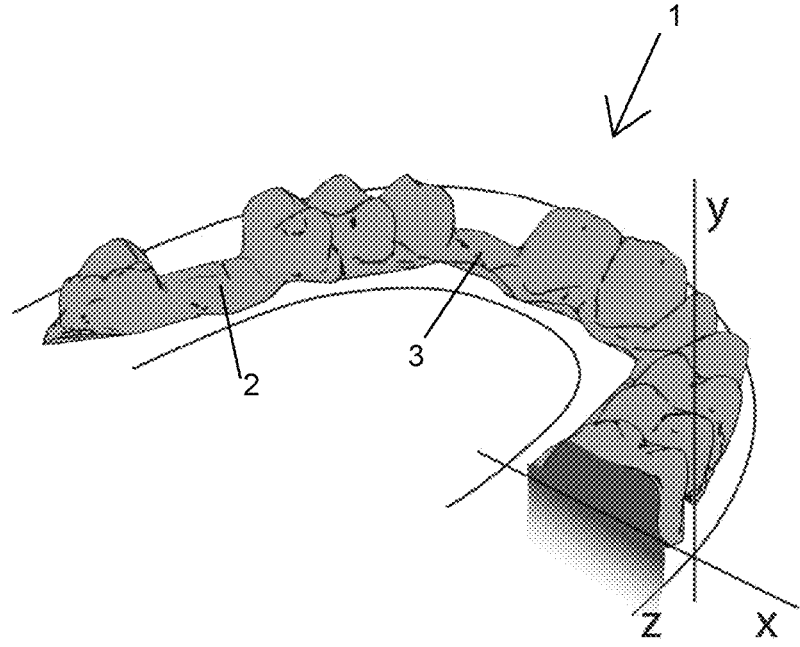
FIG. 31 shows how a system of three orthogonal axes defines a dental arch.

FIG. 31 shows a system of three mutually orthogonal axes, comprising an x-axis x, an y-axis y and a z-axis z. The z-axis z is a curved axis following the contour of the dental arch 1. The x-axis x and y-axis y are perpendicular to each other and define an xy-plane perpendicular to the dental arch 1, i.e., each xy-plane intersecting a location on the z-axis is, at that location perpendicular to the curved z-axis z. The z-axis z defines the length direction of the dental arch 1. The dental arch may miss one or more tooth members, as is illustrated by reference numbers 2 and 3 indicating the gaps due to a missing tooth. In case one or more tooth elements are missing, the gum at these locations is to be cleaned.

FIG. 1 depicts an embodiment of a mouthpiece 10, comprising a supporting structure 11 configured to encompass a plurality of teeth of a dental arch. The supporting structure 11 may be made from a (relatively) rigid material, and has an inner surface 12 configured to face a tooth surface.

The mouthpiece 10 comprises a plurality of brushing chambers 13a, 13b, 13c provided at the side of the inner surface 12 of the supporting structure 11. In the embodiment of the FIG. 1, a first brushing chamber 13a is configured to face a lingual surface of an upper or lower dental arch, a second brushing chamber 13b is configured to face a facial surface of an upper or lower dental arch, and a third brushing chamber 13c is configured to face an occlusal or incisal edge of the dental arch.

First brushing chamber 13a is connected to (is in fluid communication with) third brushing chamber 13c through a first fluid channel 14a. Second brushing chamber 13b is connected to (is in fluid communication with) third brushing chamber 13c through a second fluid channel 14b.

The mouthpiece 10 comprises a mouthpiece interface 16 comprising a mouthpiece fluid channel terminal 14c which is connected to (is in fluid communication with) second brushing chamber 13b. The mouthpiece interface 16 is configured to couple the mouthpiece 10, which is configured to be part of a dental cleaning device to be described below in more detail, to another part of the dental cleaning device, such as a handle member.

It is noted that the supporting structure of a mouthpiece may be configured to encompass a plurality of teeth, or all teeth, of the maxillary dental arch and/or a plurality of teeth, or all teeth of the mandibular dental arch. If the supporting structure of the mouthpiece is configured to encompass a plurality of teeth, or all teeth, of the maxillary dental arch only, or a plurality of teeth, or all teeth, of a mandibular dental arch only, at least a part of the cross-section of the supporting structure is U-shaped or V-shaped. If the supporting structure of the mouthpiece is configured to encompass a plurality of teeth, or all teeth, of both the maxillary dental arch and the mandibular dental arch, at least a part of the cross-section of the supporting structure is H-shaped or X-shaped.

Each brushing chamber 13a, 13b, 13c comprises a respective flexible wall part 17a, 17b, 17c, wherein the flexible wall part 17a, 17b, 17c is deformable by pressurizing or depressurizing the brushing chambers 13a, 13b, 13c.

Throughout this disclosure, the term "pressurizing" is to be taken as "increasing pressure from a pressure below environmental pressure" or "providing a pressure above environmental pressure", and the term "depressurizing" is to be taken as "decreasing pressure from a pressure above environmental pressure" or "providing a pressure below environmental pressure, including vacuum".

As shown in more detail in following Figures, bristles extend externally from the flexible wall part of the brushing chamber. The bristles may extend substantially at right angles, or at an acute angle of more than 60 degrees, to the external surface of the flexible wall part of the brushing chamber. The bristles are directed to tooth surfaces of the dental arch. The bristles may further be directed to regions of the dental gums adjoining the tooth surfaces.

First brushing chamber 13a is provided with one opening configured to allow supply of a fluid into the first brushing chamber 13a, and discharge of the fluid from the first brushing chamber 13a for pressurizing and depressurizing the first brushing chamber 13a, respectively. In the embodiment shown in FIG. 1, the opening of the first brushing chamber 13a is at the junction of the first brushing chamber 13a and the first fluid channel 14a.

Second brushing chamber 13b is provided with two openings configured to allow supply of a fluid into the second brushing chamber 13b, and discharge of the fluid from the second brushing chamber 13b for pressurizing and depressurizing the second brushing chamber 13b, respectively. In the embodiment shown in FIG. 1, one of the openings of the second brushing chamber 13b is at the junction of the second brushing chamber 13b and the second fluid channel 14b. The other one of the openings of the second brushing chamber 13b is at the junction of the second brushing chamber 13b and the mouthpiece fluid channel terminal 14c.

Third brushing chamber 13c is provided with two openings configured to allow supply of a fluid into the third brushing chamber 13c, and discharge of the fluid from the third brushing chamber 13c for pressurizing and depressurizing the third brushing chamber 13c, respectively. In the embodiment shown in FIG. 1, one of the openings of the third brushing chamber 13c is at the junction of the third brushing chamber 13c and the first fluid channel 14a. The other one of the openings of the third brushing chamber 13c is at the junction of the third brushing chamber 13c and the second fluid channel 14b.

Since in the embodiment of FIG. 1 the brushing chambers 13a, 13b and 13c are in fluid communication with each other, all brushing chambers 13a, 13b and 13c will be pressurized or depressurized at the same time, for example by feeding a fluid into the mouthpiece fluid channel terminal 14c or discharging a fluid from the mouthpiece fluid channel terminal 14c. As another example, pressurizing and depressurizing the brushing chambers 13a, 13b and 13c may also be accomplished by increasing and decreasing, respectively, an amount of a fluid already present in the brushing chambers 13a, 13b and 13c. When pressurizing and depressurizing the brushing chambers 13a, 13b and 13c, the corresponding flexible wall parts 17a, 17b and 17c will deform accordingly to thereby move bristles extending externally from the flexible wall parts 17a, 17b and 17c.

It is noted that each brushing chamber, or any number of brushing chambers among the total number of brushing chambers of the mouthpiece may have a separate fluid channel leading to it from the mouthpiece fluid channel terminal, for independently pressurizing and depressurizing one or more brushing chambers independent from at least one other brushing chamber.

Throughout this disclosure, a fluid may be a gas, such as air, or a liquid, such as water, or a combination thereof.

FIGS. 2a, 2b and 2c schematically depict cross-sectional views of an embodiment of a mouthpiece 20, in different respective operational states thereof. The mouthpiece 20 comprises a supporting structure 21. The supporting structure 21 is configured to encompass a plurality of teeth of the upper dental arch and the lower dental arch, and may be configured to encompass all teeth of the upper dental arch and the lower dental arch. At an inner surface side of the supporting structure 21, the inner surface being configured to face a tooth surface, first, second, third and fourth brushing chambers 22a, 22b, 22c, 22d are provided. In addition, a fifth brushing chamber 22e is provided, extending between opposite inner surfaces of the supporting structure 21.

The first brushing chamber 22a comprises a first flexible wall part 23a. The second brushing chamber 22b comprises a second flexible wall part 23b. The third brushing chamber 22c comprises a third flexible wall part 23c. The fourth brushing chamber 22d comprises a fourth flexible wall part 23d. The fifth brushing chamber 22e comprises a fifth flexible wall part 23e and a sixth flexible wall part 23f. The first to sixth flexible wall parts 23a to 23f are deformable, in particular by pressurizing or depressurizing the respective corresponding brushing chambers 22a to 22e. The flexible wall parts 23a to 23f may be made from an elastic material, such as a rubber material. The flexible wall parts 23a to 23f may also be made from a non-elastic material. The material of the flexible wall parts 23a to 23f may keep a predetermined shape when there is substantially no, or a low, pressure difference across an inner side and an outer side of the flexible wall parts 23a to 23f.

Tufts of bristles 24 extend externally from the flexible wall parts 23a to 23f of the brushing chambers 22a to 22e. The mouthpiece 20 is configured for the tufts of bristles 24 to engage the tooth surface of teeth of a dental arch at least when the corresponding brushing chamber 22a, 22b, 22c, 22d, 22e is pressurized.

FIG. 2a illustrates a first operational state of the mouthpiece 20 when the first to fifth brushing chambers 22a to 22e are neither pressurized nor depressurized. FIG. 2b illustrates a second operational state of the mouthpiece 20 when all brushing chambers 22a to 22e are pressurized, for example by feeding a fluid to the brushing chambers 22a to 22e, or increasing an amount of fluid in the brushing chambers 22a to 22e. As can be seen in FIG. 2b, as a result of pressurizing, the first to sixth flexible wall parts 23a to 23f take a convex shape, as seen from an exterior of the corresponding brushing chambers 22a to 22e, whereby the bristles 24, in particular the free ends thereof, may engage tooth surfaces and/or may be deformed against tooth surfaces. FIG. 2c illustrates a third operational state of the mouthpiece 20 when all brushing chambers 22a to 22e are depressurized, for example by discharging a fluid from the brushing chambers 22a to 22e, or decreasing an amount of fluid in the brushing chambers 22a to 22e. As can be seen in FIG. 2c, as a result of depressurizing, the first to sixth flexible wall parts 23a to 23f take a concave shape, as seen from an exterior of the corresponding brushing chambers 22a to 22e, whereby the bristles 24, in particular the free ends thereof, may not, or hardly, engage tooth surfaces and/or may be deformed against the tooth surfaces.

By a suitable cycle of pressurizing and depressurizing the brushing chambers 22a to 22e to go from the first operational state to the second operational state, then from the second operational state to the first operational state, then from the first operational state to the third operational state, followed by a return to the first operational state, and subsequently repeating such cycle, a most effective brushing action of the mouthpiece can be obtained. The bristles 24 of the flexible wall parts 23a to 23d generally perform an upward and downward motion during such cycling, and the bristles 24 of the flexible wall parts 23e and 23f perform a sideways motion to and fro during such cycling. In an alternative shorter cycle, the cycle is between only the first and second operational state—FIG. 2c not being part of the shorter cycle—or between the first and third operational state—FIG. 2b not being part of the shorter cycle—.

In the embodiment of mouthpiece 20, the brushing chambers 22a to 22d each comprise a tubular member fixed to the inner surface of the supporting structure 21, wherein the tubular member comprises the flexible wall part 23a to 23d provided with the bristles 24. Brushing chamber 22e also comprises a tubular member, coupled to the tubular members forming brushing chambers 22a to 22d, wherein the tubular member comprises the flexible wall parts 23e and 23f provided with the bristles 24.

FIG. 3 depicts an embodiment of a mouthpiece 30, comprising a supporting structure 31 configured to encompass a plurality of teeth of a dental arch. The supporting structure 31 has an inner surface 32 configured to face a tooth surface.

The mouthpiece 30 comprises a plurality of brushing chambers 33a, 33b, 33c, 33d, 33e and 33f provided at the side of the inner surface 32 of the supporting structure 31. In the embodiment of the FIG. 3, a first brushing chamber 33a and a second brushing chamber 33b are configured to face a lingual surface of an upper or lower dental arch, a third brushing chamber 33c and a fourth brushing chamber 33d are configured to face a facial surface of an upper or lower dental arch, and a fifth brushing chamber 33e and a sixth brushing chamber 33f are configured to face an occlusal or incisal edge of the dental arch.

First brushing chamber 33a is connected to (is in fluid communication with) fifth brushing chamber 33e through a first fluid channel 34a. Third brushing chamber 33c is connected to (is in fluid communication with) fifth brushing chamber 33e through a second fluid channel 34b.

The mouthpiece 30 comprises a mouthpiece interface 36 comprising a first mouthpiece fluid channel terminal 34c which is connected to (is in fluid communication with) third brushing chamber 33c. The mouthpiece interface 36 is configured to couple the mouthpiece 30, which is configured to be part of a dental cleaning device to be described below in more detail, to another part of the dental cleaning device, such as a handle member.

Second brushing chamber 33b is connected to (is in fluid communication with) sixth brushing chamber 33f through a fourth fluid channel 34d. Fourth brushing chamber 33d is connected to (is in fluid communication with) sixth brushing chamber 33f through a fifth fluid channel 34e.

The mouthpiece interface 36 comprises a second mouthpiece fluid channel terminal 34f which is connected to (is in fluid communication with) fourth brushing chamber 33d. The mouthpiece interface 36 is configured to couple the mouthpiece 30, which is configured to be part of a dental cleaning device to be described below in more detail, to another part of the dental cleaning device, such as a handle member.

Each brushing chamber 33a, 33b, 33c, 33d, 33e, 33f comprises a respective flexible wall part 37a, 37b, 37c, 37d, 37e, 37f. The flexible wall parts 37a, 37c, 37e are deformable by pressurizing or depressurizing the corresponding brushing chambers 33a, 33c, 33e. The flexible wall parts 37b, 37d, 37f are deformable by pressurizing or depressurizing the corresponding brushing chambers 33b, 33d, 33f. As shown in more detail in following Figures, bristles extend externally from the flexible wall part of the brushing chamber. The bristles are directed to tooth surfaces of the dental arch.

First brushing chamber 33a is provided with one opening configured to allow supply of a fluid into the first brushing chamber 33a, and discharge of the fluid from the first brushing chamber 33a for pressurizing and depressurizing the first brushing chamber 33a, respectively. In the embodiment shown in FIG. 3, the opening of the first brushing chamber 33a is at the junction of the first brushing chamber 33a and the first fluid channel 34a.

Second brushing chamber 33b is provided with one opening configured to allow supply of a fluid into the second brushing chamber 33b, and discharge of the fluid from the second brushing chamber 33b for pressurizing and depressurizing the second brushing chamber 33*b*, respectively. In the embodiment shown in FIG. 3, the opening of the second brushing chamber 33*b* is at the junction of the second brushing chamber 33*b* and the fourth fluid channel 34*d*.

Third brushing chamber 33*c* is provided with two openings configured to allow supply of a fluid into the third brushing chamber 33*c*, and discharge of the fluid from the third brushing chamber 33*c* for pressurizing and depressurizing the third brushing chamber 33*c*, respectively. In the embodiment shown in FIG. 3, one of the openings of the third brushing chamber 33*c* is at the junction of the third brushing chamber 33*c* and the second fluid channel 34*b*. The other one of the openings of the third brushing chamber 33*c* is at the junction of the third brushing chamber 33*c* and the first mouthpiece fluid channel terminal 34*c*.

Fourth brushing chamber 33*d* is provided with two openings configured to allow supply of a fluid into the fourth brushing chamber 33*d*, and discharge of the fluid from the fourth brushing chamber 33*d* for pressurizing and depressurizing the fourth brushing chamber 33*d*, respectively. In the embodiment shown in FIG. 3, one of the openings of the fourth brushing chamber 33*d* is at the junction of the fourth brushing chamber 33*d* and the fifth fluid channel 34*e*. The other one of the openings of the fourth brushing chamber 33*d* is at the junction of the fourth brushing chamber 33*d* and the second mouthpiece fluid channel terminal 34*f*.

Fifth brushing chamber 33*e* is provided with two openings configured to allow supply of a fluid into the fifth brushing chamber 33*e*, and discharge of the fluid from the fifth brushing chamber 33*e* for pressurizing and depressurizing the fifth brushing chamber 33*e*, respectively. In the embodiment shown in FIG. 3, one of the openings of the fifth brushing chamber 33*e* is at the junction of the fifth brushing chamber 33*e* and the first fluid channel 34*a*. The other one of the openings of the fifth brushing chamber 33*e* is at the junction of the fifth brushing chamber 33*e* and the second fluid channel 34*b*.

Sixth brushing chamber 33*f* is provided with two openings configured to allow supply of a fluid into the sixth brushing chamber 33*f*, and discharge of the fluid from the sixth brushing chamber 33*f* for pressurizing and depressurizing the sixth brushing chamber 33*f*, respectively. In the embodiment shown in FIG. 3, one of the openings of the sixth brushing chamber 33*f* is at the junction of the sixth brushing chamber 33*f* and the fourth fluid channel 34*d*. The other one of the openings of the sixth brushing chamber 33*f* is at the junction of the sixth brushing chamber 33*f* and the fifth fluid channel 34*e*.

Since in the embodiment of FIG. 3 the first, third and fifth brushing chambers 33*a*, 33*c* and 33*e* are in fluid communication with each other, the first, third and fifth brushing chambers 33*a*, 33*c* and 33*e* will be pressurized or depressurized at the same time, for example by feeding a fluid into the first mouthpiece fluid channel terminal 34*c* or discharging a fluid from the first mouthpiece fluid channel terminal 34*c*. As another example, pressurizing and depressurizing the first, third and fifth brushing chambers 33*a*, 33*c* and 33*e* may also be accomplished by increasing and decreasing, respectively, an amount of a fluid already present in the first, third and fifth brushing chambers 33*a*, 33*c* and 33*e*.

Further, since in the embodiment of FIG. 3 the second, fourth and sixth brushing chambers 33*b*, 33*d* and 33*f* are in fluid communication with each other, the second, fourth and sixth brushing chambers 33*b*, 33*d* and 33*f* will be pressurized or depressurized at the same time, for example by feeding a fluid into the second mouthpiece fluid channel terminal 34*f* or discharging a fluid from the first mouthpiece fluid channel terminal 34*f*. As another example, pressurizing and depressurizing the second, fourth and sixth brushing chambers 33*b*, 33*d* and 33*f* may also be accomplished by increasing and decreasing, respectively, an amount of a fluid already present in the second, fourth and sixth brushing chambers 33*b*, 33*d* and 33*f*.

When pressurizing and depressurizing the first, third and fifth brushing chambers 33*a*, 33*c* and 33*e*, the corresponding flexible wall parts 37*a*, 37*c* and 37*e* will deform accordingly to thereby move bristles extending externally from the flexible wall parts 37*a*, 37*c* and 37*e*.

When pressurizing and depressurizing the second, fourth and sixth brushing chambers 33*b*, 33*d* and 33*f*, the corresponding flexible wall parts 37*b*, 37*d* and 37*f* will deform accordingly to thereby move bristles extending externally from the flexible wall parts 37*b*, 37*d* and 37*f*.

The pressurizing and depressurizing of the first, third and fifth brushing chambers 33*a*, 33*c* and 33*e*, and the pressurizing and depressurizing of the second, fourth and sixth brushing chambers 33*b*, 33*d* and 33*f* may be synchronized to each other, where a pressurizing of the first, third and fifth brushing chambers 33*a*, 33*c* and 33*e* is performed while depressurizing the second, fourth and sixth brushing chambers 33*b*, 33*d* and 33*f*, and the other way around, in particular when the first, third and fifth brushing chambers 33*a*, 33*c* and 33*e* have bristles extending to other parts of the dental surfaces than the second, fourth and sixth brushing chambers 33*b*, 33*d* and 33*f*.

It is noted that each brushing chamber, or any number of brushing chambers among the total number of brushing chambers of the mouthpiece may have a separate fluid channel leading to it from the mouthpiece fluid channel terminal, for independently pressurizing and depressurizing one or more brushing chambers independent from at least one other brushing chamber.

FIGS. 4*a*, 4*b* and 4*c* schematically depict cross-sectional views of an embodiment of a mouthpiece 40, in different respective operational states thereof. The mouthpiece 40 comprises a supporting structure 41. The supporting structure 41 is configured to encompass a plurality of teeth of the upper dental arch and the lower dental arch, and may be configured to encompass all teeth of the upper dental arch and the lower dental arch. At an inner surface side of the supporting structure 41, the inner surface being configured to face a tooth surface, first, second, third, fourth, fifth, sixth, seventh and eighth brushing chambers 42*a*, 42*b*, 42*c*, 42*d*, 42*e*, 42*f*, 42*g* and 42*h* are provided. In addition, ninth and tenth brushing chambers 42*i* and 42*j* are provided, extending between opposite inner surfaces of the supporting structure 41.

The first brushing chamber 42*a* comprises a first flexible wall part 43*a*. The second brushing chamber 42*b* comprises a second flexible wall part 43*b*. The third brushing chamber 42*c* comprises a third flexible wall part 43*c*. The fourth brushing chamber 42*d* comprises a fourth flexible wall part 43*d*. The fifth brushing chamber 42*e* comprises a fifth flexible wall part 43*e*. The sixth brushing chamber 42*f* comprises a sixth flexible wall part 43*f*. The seventh brushing chamber 42*g* comprises a seventh flexible wall part 43*g*. The eighth brushing chamber 42*h* comprises an eighth flexible wall part 43*h*. The ninth brushing chamber 42*i* comprises a ninth flexible wall part 43*i* and a tenth flexible wall part 43*j*. The tenth brushing chamber 42*j* comprises an eleventh flexible wall part 43*k* and a twelfth flexible wall part 43*l*. The first to twelfth flexible wall parts 43*a* to 43*l* are deformable, in particular by pressurizing or depressurizing the respective corresponding brushing chambers 42*a* to 42*j*.

The flexible wall parts 43a to 43l may be made from an elastic material, such as a rubber material. The flexible wall parts 43a to 43l may also be made from a non-elastic material. The material of the flexible wall parts 43a to 43l may keep a predetermined shape when there is substantially no, or a low, pressure difference across an inner side and an outer side of the flexible wall parts 43a to 43l.

Tufts of bristles 44 extend externally from the flexible wall parts 43a to 43l of the brushing chambers 42a to 42j. The mouthpiece 40 is configured for the tufts of bristles 44 to engage the tooth surface of teeth of a dental arch at least when the corresponding brushing chamber 42a, 42b, 42c, 42d, 42e, 42f, 42g, 42h, 42i, 42j is pressurized.

FIG. 4a illustrates a first operational state of the mouthpiece 40 when the first to tenth brushing chambers 42a to 42j are neither pressurized nor depressurized. FIG. 4b illustrates a second operational state of the mouthpiece 40 when first, third, fifth, seventh and ninth brushing chambers 42a, 42c, 42e, 42g and 42i are pressurized, for example by feeding a fluid to the brushing chambers 42a, 42c, 42e, 42g and 42i, or increasing an amount of fluid in the brushing chambers 42a, 42c, 42e, 42g and 42i. Second, fourth, sixth, eighth and tenth brushing chambers 42b, 42d, 42f, 42h and 42j are depressurized, for example by discharging a fluid from the brushing chambers 42b, 42d, 42f, 42h and 42j, or decreasing an amount of fluid in the brushing chambers 42b, 42d, 42f, 42h and 42j. As can be seen in FIG. 4b, as a result of pressurizing, the first, third, fifth, seventh, ninth and tenth flexible wall parts 43a, 43c, 43e, 43g, 43i and 43j take a convex shape, as seen from an exterior of the corresponding brushing chambers 42a, 42c, 42e, 42g and 42i, whereby the bristles 44, in particular the free ends thereof, may engage tooth surfaces and/or may be deformed against tooth surfaces. The second, fourth, sixth, eighth, eleventh and twelfth flexible wall parts 43b, 43d, 43f, 43h, 43k and 43l take a concave shape, as seen from an exterior of the corresponding second, fourth, sixth, eighth and tenth brushing chambers 42b, 42d, 42f, 42h and 42j, whereby the bristles 44, in particular the free ends thereof, may or may not engage tooth surfaces and/or may be deformed against tooth surfaces. FIG. 4c illustrates a third operational state of the mouthpiece 40 when second, fourth, sixth, eighth and tenth brushing chambers 42b, 42d, 42f, 42h and 42j are pressurized, for example by feeding a fluid to the second, fourth, sixth, eighth and tenth brushing chambers 42b, 42d, 42f, 42h and 42j, or increasing an amount of fluid in the second, fourth, sixth, eighth and tenth brushing chambers 42b, 42d, 42f, 42h and 42j. First, third, fifth, seventh and ninth brushing chambers 42a, 42c, 42e, 42g and 42i are depressurized, for example by discharging a fluid from the brushing chambers 42a, 42c, 42e, 42g and 42i, or decreasing an amount of fluid in the brushing chambers 42a, 42c, 42e, 42g and 42i. As a result of pressurizing, the second, fourth, sixth, eighth, eleventh and twelfth flexible wall parts 43b, 43d, 43f, 43h, 43k and 43l take a convex shape, as seen from an exterior of the corresponding brushing chambers 42b, 42d, 42f, 42h and 42j, whereby the bristles 44, in particular the free ends thereof, may engage tooth surfaces and/or may be deformed against tooth surfaces. The first, third, fifth, seventh, ninth and tenth flexible wall parts 43a, 43c, 43e, 43g, 43i and 43j take a concave shape, as seen from an exterior of the corresponding first, third, fifth, seventh and ninth brushing chambers 42a, 42c, 42e, 42g and 42i, whereby the bristles 44, in particular the free ends thereof, may or may not, or hardly, engage tooth surfaces and/or may be deformed against tooth surfaces.

By a suitable cycle of pressurizing and depressurizing the brushing chambers 42a to 42j to go from the first operational state to the second operational state, then from the second operational state to the first operational state, then from the first operational state to the third operational state, followed by a return to the first operational state, and subsequently repeating such cycle, a most effective brushing action of the mouthpiece can be obtained. The bristles 44 of the flexible wall parts 43a to 43h generally perform an upward and downward motion during such cycling, and the bristles 44 of the flexible wall parts 43i to 43l perform a sideways motion to and fro during such cycling. In an alternative shorter cycle, the cycle is between only the first and second operational state—FIG. 4c not being part of the shorter cycle—or between the first and third operational state—FIG. 4b not being part of the shorter cycle—.

In the embodiment of mouthpiece 40, the brushing chambers 42a to 42h each comprise a tubular member fixed to the inner surface of the supporting structure 41, wherein the tubular member comprises the flexible wall part 43a to 43h provided with the bristles 44. Brushing chambers 42i and 42j also each comprise a tubular member, coupled to the tubular members forming brushing chambers 42a to 42h, wherein these tubular members comprises the flexible wall parts 43i to 43l provided with the bristles 44.

Figures 5A, 5B, 5C:
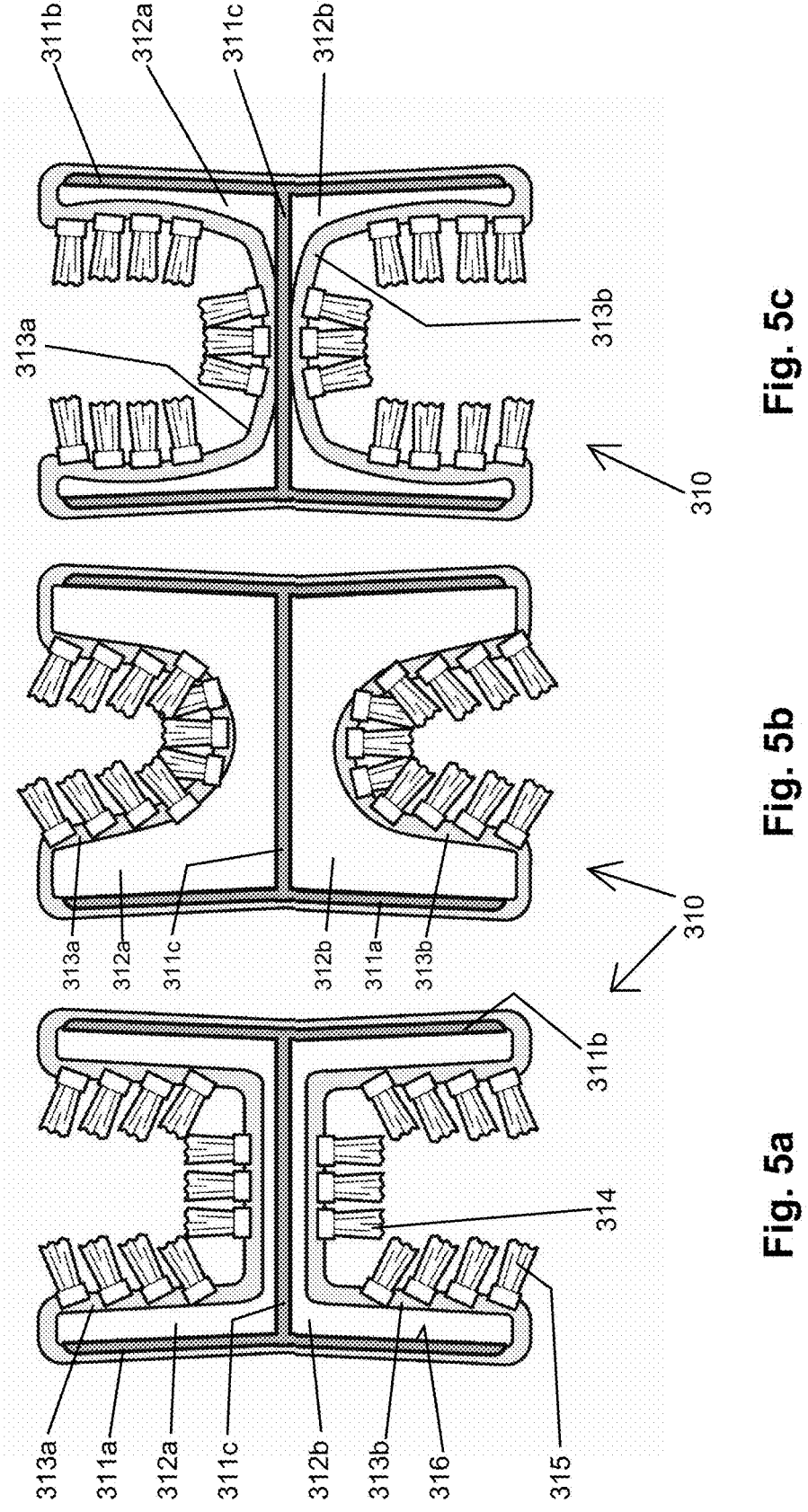
FIGS. 5a, 5b and 5c schematically depict cross-sectional views of an embodiment of a mouthpiece according to the invention, in different respective operational states thereof.

FIGS. 5a, 5b and 5c schematically depict cross-sectional views of an embodiment of a mouthpiece 310, in different respective operational states thereof. This cross-sectional view might be about the same all over the length—as defined in FIG. 31—of the dental arch.

The mouthpiece 310 comprises a supporting structure 311a, 311b, 311c, comprising two side parts 311a and 311b and an intermediate part 311c connecting the side parts 311a and 311b. The supporting structure 311 is configured to encompass a plurality of teeth of the upper dental arch and the lower dental arch, and may be configured to encompass all teeth of the upper dental arch and the lower dental arch. At an inner surface side 316 of the supporting structure 311a, 311b—which inner surface is configured to face a tooth surface—first and second brushing chambers 312a, 312b are provided.

The first brushing chamber 312a comprises a first flexible wall part 313a. The second brushing chamber 312b comprises a second flexible wall part 313b. The first and second flexible wall parts 313a, 313b are deformable, in particular by pressurizing or depressurizing the respective corresponding brushing chambers 312a respectively 312b. The flexible wall parts 313a, 331b may be made from an elastic material, such as a rubber material. The flexible wall parts 313a, 313b may also be made from a non-elastic material. The material of the flexible wall parts 313a, 313b may keep a predetermined shape when there is substantially no, or a low, pressure difference across an inner side and an outer side of the flexible wall parts 313a, 313b.

Tufts 314 of bristles 315 extend externally from the flexible wall parts 313a, 313b of the brushing chambers 312a, 312b. The mouthpiece 310 is configured for the tufts of bristles 335 to engage the tooth surface of teeth of a dental arch at least when the corresponding brushing chamber 312a, 312b is pressurized. Viewed in length direction of the dental arch—as defined in FIG. 31—, the tufts 314 of bristles 315 may be arranged at about the same density as viewed in cross-section (shown in FIGS. 5a, 5b, 5c).

FIG. 5a illustrates a first operational state of the mouthpiece 310 when the first and second brushing chambers 312a, 312b are neither pressurized nor depressurized. FIG. 5b illustrates a second operational state of the mouthpiece 310 when the brushing chambers 312a, 312b are pressurized, for example by feeding a fluid to the brushing chambers 312a, 312b, or increasing an amount of fluid in the brushing chambers 312a, 312b. As can be seen in FIG. 5b, as a result of pressurizing, the first and second flexible wall parts 313a, 313b take a convex shape, as seen from an exterior of the corresponding brushing chambers 312a, 312b, whereby the bristles 315, in particular the free ends thereof, may engage tooth surfaces and/or may be deformed against tooth surfaces. FIG. 5c illustrates a third operational state of the mouthpiece 310 when all brushing chambers 312a, 312b are depressurized, for example by discharging a fluid from the brushing chambers 312a, 312b, or decreasing an amount of fluid in the brushing chambers 312a, 312b. As can be seen in FIG. 5c, as a result of depressurizing, the first and second flexible wall parts 313a, 313b take a concave shape, as seen from an exterior of the corresponding brushing chambers 312a, 312b, whereby the bristles 314, in particular the free ends thereof, may not, or hardly, engage tooth surfaces and/or may be deformed against the tooth surfaces.

By a suitable cycle of pressurizing and depressurizing the brushing chambers 312a, 312b to go from the first operational state to the second operational state, then from the second operational state to the first operational state, then from the first operational state to the third operational state, followed by a return to the first operational state, and subsequently repeating such cycle, a most effective brushing action of the mouthpiece can be obtained. The bristles 314 in the centre of the flexible wall parts 313a, 313b generally perform an upward and downward motion during such cycling, and the bristles 314 at the sides of the flexible wall parts 313a, 313b perform a sideways motion to and fro during such cycling. In an alternative shorter cycle, the cycle is between only the first and second operational state—FIG. 5c not being part of the shorter cycle—or between the first and third operational state—FIG. 5b not being part of the shorter cycle—.

In the embodiment of mouthpiece 310, the brushing chambers 312a, 312b may each comprise a tubular member fixed to the inner surface of the supporting structure 311, wherein the tubular member comprises the flexible wall part 313a, 313b provided with the bristles 314.

Figures 6A, 6B, 6C:
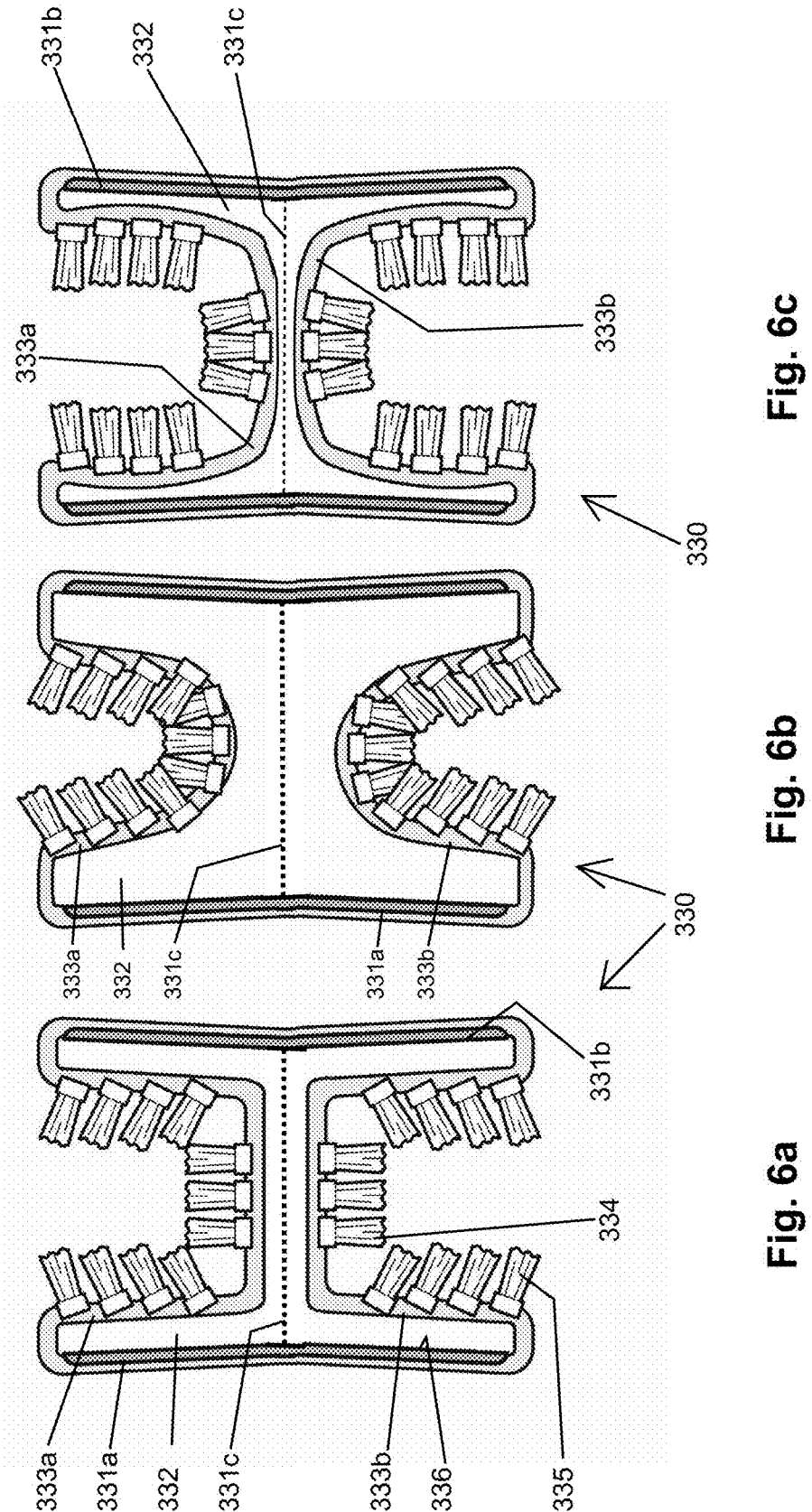
FIGS. 6a, 6b and 6c schematically depict cross-sectional views of an embodiment of a mouthpiece according to the invention, in different respective operational states thereof.

FIGS. 6a, 6b and 6c schematically depict cross-sectional views of an embodiment of a mouthpiece 330, in different respective operational states thereof. This cross-sectional view might be about the same all over the length—as defined in FIG. 31—of the dental arch.

The mouthpiece 330 comprises a supporting structure 331a, 331b, 331c, comprising two side parts 331a and 331b and a plurality of intermediate parts 331c connecting the side parts 331a and 331b. These intermediate parts may be bars. The supporting structure 331 is configured to encompass a plurality of teeth of the upper dental arch and the lower dental arch, and may be configured to encompass all teeth of the upper dental arch and the lower dental arch. At an inner surface side 336 of the supporting structure 331a, 331b—which inner surface is configured to face a tooth surface—a single brushing chamber 332 is provided.

The single brushing chamber 332 comprises a first flexible wall part 333a and second flexible wall part 333b. The first and second flexible wall parts 333a, 333b are deformable, in particular by pressurizing or depressurizing the brushing chamber 332. The flexible wall parts 333a, 333b may be made from an elastic material, such as a rubber material. The flexible wall parts 333a, 333b may also be made from a non-elastic material. The material of the flexible wall parts 333a, 333b may keep a predetermined shape when there is substantially no, or a low, pressure difference across an inner side and an outer side of the flexible wall parts 333a, 333b.

Tufts 334 of bristles 335 extend externally from the flexible wall parts 333a, 333b of the brushing chambers 332a, 332b. The mouthpiece 330 is configured for the tufts of bristles 335 to engage the tooth surface of teeth of a dental arch at least when the brushing chamber 332 is pressurized. Viewed in length direction of the dental arch—as defined in FIG. 31—, the tufts 334 of bristles 335 may be arranged at about the same density as viewed in cross-section (shown in FIGS. 6a, 6b, 6c).

FIG. 6a illustrates a first operational state of the mouthpiece 330 when the brushing chamber 332 is neither pressurized nor depressurized. FIG. 6b illustrates a second operational state of the mouthpiece 330 when the brushing chamber 332 is pressurized, for example by feeding a fluid to the brushing chamber 332, or increasing an amount of fluid in the brushing chamber 332. As can be seen in FIG. 6b, as a result of pressurizing, the first and second flexible wall parts 333a, 333b take a convex shape, as seen from an exterior of the brushing chamber 332, whereby the bristles 335, in particular the free ends thereof, may engage tooth surfaces and/or may be deformed against tooth surfaces. FIG. 6c illustrates a third operational state of the mouthpiece 330 when the brushing chamber 332 is depressurized, for example by discharging a fluid from the brushing chamber 332, or decreasing an amount of fluid in the brushing chamber 332. As can be seen in FIG. 6c, as a result of depressurizing, the first and second flexible wall parts 333a, 333b take a concave shape, as seen from an exterior of the brushing chamber 332, whereby the bristles 334, in particular the free ends thereof, may not, or hardly, engage tooth surfaces and/or may be deformed against the tooth surfaces.

By a suitable cycle of pressurizing and depressurizing the brushing chamber 332 to go from the first operational state to the second operational state, then from the second operational state to the first operational state, then from the first operational state to the third operational state, followed by a return to the first operational state, and subsequently repeating such cycle, a most effective brushing action of the mouthpiece can be obtained. The bristles 334 in the centre of the flexible wall parts 333a, 333b generally perform an upward and downward motion during such cycling, and the bristles 334 at the sides of the flexible wall parts 333a, 333b generally perform a sideways motion to and fro during such cycling. In an alternative shorter cycle, the cycle is between only the first and second operational state—FIG. 6c not being part of the shorter cycle—or between the first and third operational state—FIG. 6b not being part of the shorter cycle—.

In the embodiment of mouthpiece 310, the brushing chamber 312 may comprise a tubular member fixed to the inner surface of the supporting structure 311, wherein the tubular member comprises the flexible wall part 313a, 313b provided with the bristles 314.

The main difference between the embodiment of FIGS. 5a, 5b, 5c and the embodiment of FIGS. 6a, 6b, 6c is that the embodiment of FIGS. 5a, 5b, 5c has two brushing chambers divided by the intermediate part 311c of the support structure, whilst the embodiment of FIGS. 6a, 6b, 6c has one brushing chamber and a plurality of intermediate parts 331c. By providing the intermediate part 311c of the embodiment of FIGS. 5a, 5b, 5c with a plurality of passages or one such passage, connecting the brushing chambers 312a and 312b, the embodiment of FIGS. 5a, 5b, 5c becomes virtually the same as the embodiment of FIGS. 6a, 6b, 6c.

FIGS. 7a, 7b, 7c and 7d schematically depict cross-sectional views of a further embodiment of a mouthpiece 50 comprising positioning chambers and a brushing chambers, in different respective operational states thereof.

The mouthpiece 50 comprises a supporting structure 51. The supporting structure 51 is configured to encompass a plurality of teeth of the upper dental arch and the lower dental arch, and may be configured to encompass all teeth of the upper dental arch and the lower dental arch. At an inner surface side of the supporting structure 51, the inner surface being configured to face a tooth surface, first, second, third and fourth positioning chambers 52a, 52b, 52c and 52d are provided. In addition, first, second, third, fourth, fifth, sixth, seventh, eighth, ninth, tenth, eleventh and twelfth brushing chambers 55a, 55b, 55c, 55d, 55e, 55f, 55g, 55h, 55i, 55j, 55k and 55l are provided. The first positioning chamber 52a is located between the inner surface of the supporting structure 51 and the first, second and third brushing chambers 55a, 55b, 55c. The second positioning chamber 52b is located between the inner surface of the supporting structure 51 and the fourth, fifth and sixth brushing chambers 55d, 55e, 55f. The third positioning chamber 52c is located between the inner surface of the supporting structure 51 and the seventh, eighth and ninth brushing chambers 55g, 55h, 55i. The fourth positioning chamber 52d is located between the inner surface of the supporting structure 51 and the tenth, eleventh and twelfth brushing chambers 55j, 55k, 55l.

The first positioning chamber 52a comprises a first flexible wall part 56a. The second positioning chamber 52b comprises a second flexible wall part 56b. The third positioning chamber 52c comprises a third flexible wall part 56c. The fourth positioning chamber 52d comprises a fourth flexible wall part 56d. The first brushing chamber 55a comprises a fifth flexible wall part 53a. The second brushing chamber 55b comprises a sixth flexible wall part 53b. The third brushing chamber 55c comprises a seventh flexible wall part 53c. The fourth brushing chamber 55d comprises an eighth flexible wall part 53d. The fifth brushing chamber 55e comprises a ninth flexible wall part 53e. The sixth brushing chamber 55f comprises a tenth flexible wall part 53f. The seventh brushing chamber 55g comprises an eleventh flexible wall part 53g. The eighth brushing chamber 55h comprises a twelfth flexible wall part 53h. The ninth brushing chamber 55i comprises a thirteenth flexible wall part 53i. The tenth brushing chamber 55j comprises a fourteenth flexible wall part 53j. The eleventh brushing chamber 55k comprises a fifteenth flexible wall part 53k. The twelfth brushing chamber 55l comprises a sixteenth flexible wall part 53l. The first to sixteenth flexible wall parts 56a to 56d, 53a to 53l are deformable, in particular by pressurizing or depressurizing the respective corresponding positioning chambers 52a to 52d and brushing chambers 55a to 55l. The flexible wall parts 56a to 56d, 53a to 53l may be made from an elastic material, such as a rubber material. The flexible wall parts 56a to 56d, 53a to 53l may also be made from a non-elastic material. The material of the flexible wall parts 56a to 56d, 53a to 53l may keep a predetermined shape when there is substantially no, or a low, pressure difference across an inner side and an outer side of the flexible wall parts 56a to 56d, 53a to 53l.

Tufts of bristles 54 extend externally from the flexible wall parts 53a to 53l of the brushing chambers 55a to 55l. The mouthpiece 50 is configured for the tufts of bristles 54 to engage the tooth surface of teeth 58 of a dental arch at least when the corresponding positioning chambers 52a and 52c, or 52b and 52d, respectively are pressurized, as illustrated in FIG. 7b.

FIG. 7a illustrates a first operational state of the mouthpiece 50 when the first to fourth positioning chambers 52a to 52d, and the first to twelfth brushing chambers 55a to 55l are neither pressurized nor depressurized. In the first operational state, the mouthpiece 50 can be easily brought into a person's mouth, and teeth can be easily brought between the bristles 54.

FIG. 7b illustrates a second operational state of the mouthpiece 50 when the positioning chambers 52a and 52c are pressurized to have the tufts of bristles 54 of first, second, third, seventh, eighth and ninth brushing chambers 55a, 55b, 55c, 55g, 55h and 55i engage a tooth surface of teeth 58. Similarly, although not shown in FIG. 7b, positioning chambers 52b and 52d may be pressurized to have the bristles 54 of fourth, fifth, sixth, tenth, eleventh and twelfth brushing chambers 55d, 55e, 55f, 55j, 55k and 55l engage a tooth surface of teeth. In the second operational state of the mouthpiece 50, the brushing chambers 55a to 55l are neither pressurized nor depressurized. The second operational state adapts the position of the first, second, third, seventh, eighth and ninth brushing chambers 55a, 55b, 55c, 55g, 55h and 55i to closely conform to a shape of the particular teeth to be brushed.

FIG. 7c illustrates a third operational state of the mouthpiece 50 in which positioning chambers 52a and 52c remain pressurized, and in addition first, third and eighth brushing chambers 55a, 55c and 55h are pressurized, for example by feeding a fluid to the brushing chambers 55a, 55c and 55h, or increasing an amount of fluid in the brushing chambers 55a, 55c and 55h. The positioning chambers 52b and 52d are neither pressurized nor depressurized. Second, seventh and ninth brushing chambers 55b, 55g and 55i are depressurized, for example by discharging a fluid from the brushing chambers 55b, 55g and 55i, or decreasing an amount of fluid in the brushing chambers 55b, 55g and 55i. As can be seen in FIG. 7c, as a result of pressurizing, the first, third and eighth flexible wall parts 53a, 53c and 53h take a convex shape, as seen from an exterior of the corresponding brushing chambers 55a, 55c and 55h, whereby the bristles 54, in particular the free ends thereof, may engage tooth surfaces and/or may be deformed against tooth surfaces. The second, seventh and ninth flexible wall parts 53b, 53g and 53i take a concave shape, as seen from an exterior of the corresponding second, seventh and ninth brushing chambers 55b, 55g and 55i, whereby the bristles 54, in particular the free ends thereof, may or may not engage tooth surfaces and/or may be deformed against tooth surfaces.

FIG. 7d illustrates a fourth operational state of the mouthpiece 50 in which positioning chambers 52a and 52c remain pressurized, and in addition second, seventh and ninth brushing chambers 55b, 55g and 55i are pressurized, for example by feeding a fluid to the second, seventh and ninth brushing chambers 55b, 55g and 55i, or increasing an amount of fluid in the second, seventh and ninth brushing chambers 55b, 55g and 55i. First, third and eighth brushing chambers 55a, 55c and 55h are depressurized, for example by discharging a fluid from the brushing chambers 55a, 55c and 55h, or decreasing an amount of fluid in the brushing chambers 55a, 55c and 55h. As a result of pressurizing, the second, seventh and ninth flexible wall parts 53b, 53g and 53i take a convex shape, as seen from an exterior of the corresponding brushing chambers 55b, 55g and 55i, whereby the bristles 54, in particular the free ends thereof, may engage tooth surfaces and/or may be deformed against tooth surfaces. The first, third and eighth flexible wall parts 53a, 53c and 53h take a concave shape, as seen from an exterior of the corresponding first, third and eighth brushing chambers 55a, 55c and 55h, whereby the bristles 54, in particular the free ends thereof, may or may not, or hardly, engage tooth surfaces and/or may be deformed against tooth surfaces.

By a suitable cycle of pressurizing and depressurizing the brushing chambers 55a to 55c and 55g to 55i to go from the third operational state (FIG. 7c) to the fourth operational state (FIG. 7d), then from the fourth operational state to the third operational state, and repeating such cycle while keeping the positioning chambers 52a and 52c pressurized, a most effective brushing action of the mouthpiece can be obtained. The pressurized positioning chambers 52a, 52c ensure that the bristles 54 contact essentially the complete surface of the teeth, including interdental surfaces. The bristles 54 of the flexible wall parts 53a to 53c and 53g to 53i generally perform an upward and downward motion during such cycling, and some bristles 54 of the flexible wall parts 53c and 53i perform a sideways motion to and fro during such cycling.

In the embodiment of mouthpiece 50, the brushing chambers 55a to 55c each comprise a tubular member fixed to the positioning chamber 52a which is also shaped as a tubular member. The brushing chambers 55d to 55f each comprise a tubular member fixed to the positioning chamber 52b which is also shaped as a tubular member. The brushing chambers 55g to 55i each comprise a tubular member fixed to the positioning chamber 52c which is also shaped as a tubular member. The brushing chambers 55j to 55l each comprise a tubular member fixed to the positioning chamber 52d which is also shaped as a tubular member. The tubular members forming the first to twelfth brushing chambers 55a to 55l comprise the flexible wall parts 53a to 53l, respectively, provided with the bristles 54. The tubular members forming the first to fourth positioning chambers 52a to 52d comprise a flexible wall part where the associated brushing chambers 55a to 55l are formed to have a common wall with the respective associated positioning chambers 52a to 52d. Part of the tubular members forming the first to fourth positioning chambers 52a to 52d is attached to the supporting structure 51. The tubular members may be integrally formed, e.g., by extrusion.

Figures 8, 9, 10A, 10B, 10C, 10D, 11, 12, 13:
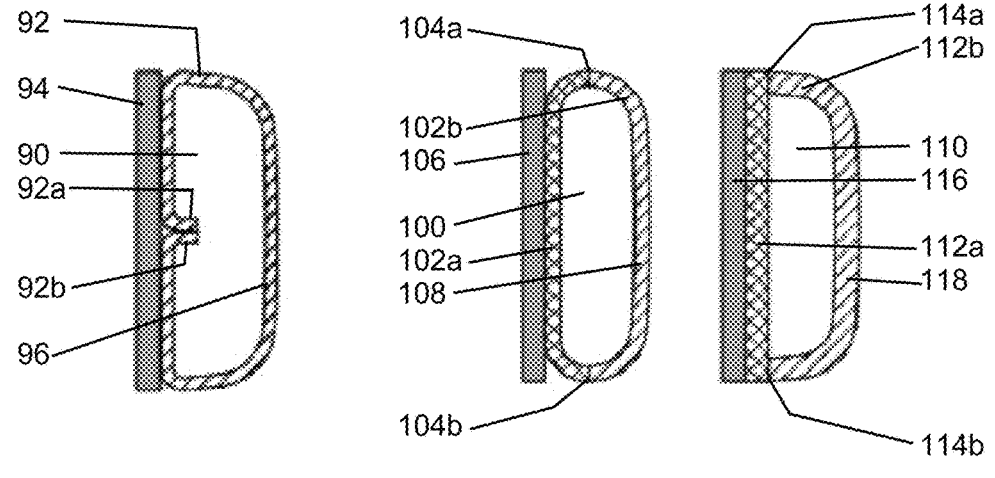

FIGS. 8 and 9 illustrate embodiments of positioning or brushing chambers which contain a bladder made from a flexible material, and wherein a flexible wall part is deformable by pressurizing or depressurizing the bladder. In the embodiment of FIG. 8, a positioning or brushing chamber 60 has at least one flexible wall part 62. A bladder 64 is contained in the positioning or brushing chamber 60. The bladder 64 is made from a flexible material. The bladder 64 may be made from a resilient material. In the embodiment of FIG. 9, a mouthpiece 70 comprises first, second, third, fourth and fifth brushing chambers 72a, 72b, 72c, 72d and 72e having respective flexible wall parts 74a, 74b, 74c, 74d, 74e and 74f. The first, second, third, fourth and fifth brushing chambers 72a, 72b, 72c, 72d and 72e contain a first, second, third, fourth and fifth bladder 76a, 76b, 76c, 76d, 76e, respectively, made from a flexible and/or resilient material.

Each bladder 64, 76a, 76b, 76c, 76d, 76e is provided with an opening configured to allow supply of a fluid into the bladder 64, 76a, 76b, 76c, 76d, 76e, and discharge of the fluid from the bladder 64, 76a, 76b, 76c, 76d, 76e for pressurizing and depressurizing the associated brushing chamber 60, 72a, 72b, 72c, 72d, 72e, respectively. Each of the brushing chambers 60, 72a, 72b, 72c, 72d, 72e may be closed, or may be in open fluid communication with an exterior of the brushing chamber 60, 72a, 72b, 72c, 72d, 72e. Upon pressurizing, the volume of a bladder 64, 76a, 76b, 76c, 76d, 76e increases to push the flexible wall part(s) 74a, 74b, 74c, 74d, 74e and 74f of the brushing chamber 60, 72a, 72b, 72c, 72d, 72e outwards. Upon depressurizing, the volume of a bladder 64, 76a, 76b, 76c, 76d, 76e decreases to allow the flexible wall part(s) 74a, 74b, 74c, 74d, 74e and 74f of the brushing chamber 60, 72a, 72b, 72c, 72d, 72e to move inwards. Pressurizing and depressurizing the bladders 64, 76a, 76b, 76c, 76d, 76e thus leads to a brushing action of bristles extending outwards from the flexible wall parts 74a, 74b, 74c, 74d, 74e and 74f. The pressurizing or depressurizing of the bladders 64, 76a, 76b, 76c, 76d, 76e can be performed by feeding a fluid into the bladders 64, 76a, 76b, 76c, 76d, 76e or discharging a fluid from the bladders 64, 76a, 76b, 76c, 76d, 76e, or by increasing an amount of fluid in the bladders 64, 76a, 76b, 76c, 76d, 76e or decreasing an amount of fluid in the bladders 64, 76a, 76b, 76c, 76d, 76e, respectively.

FIG. 10a illustrates a further embodiment of a positioning chamber or a brushing chamber, and FIGS. 10b, 10c and 10d illustrate further embodiments of a mouthpieces incorporating such further type of embodiments of a positioning chamber or a brushing chamber.

According to FIG. 10a, a positioning chamber or brushing chamber 80 comprises a wall member 82 having edges 82a, wherein the edges 82a are fixed to the inner surface of a supporting structure 84. The wall member 82 comprises a flexible wall part 83 which is to be provided with bristles extending outwardly from the flexible wall part 83. The fixing of the edges 82a of the wall member 82 may be done by coextruding, moulding, gluing, welding or any other suitable method.

FIG. 10b depicts a mouthpiece 81a having a supporting structure 85 comprising a central part 85a. A wall member 86a forms brushing chambers 87a, 87b and 87c, wherein edges 88a, 88b, 88c and 88d of the wall member 86a are fixed to an upper inner surface of the supporting structure 85. A wall member 86b forms brushing chambers 87d, 87e and 87f, wherein edges 88e, 88f, 88g and 88h of the wall member 86b are fixed to a lower inner surface of the supporting structure 85. The brushing chambers 87a to 87f comprise flexible wall parts 89a to 89f, respectively.

The embodiment of the mouthpiece 81b of FIG. 10c differs from the embodiment of FIG. 10b in that a central part 85a of the supporting structure 85 as shown in FIG. 10b has been removed in the embodiment of FIG. 10c. Thus, brushing chambers 87b and 87e as shown in FIG. 10b are combined into brushing chamber 87g according to FIG. 10c.

In the embodiment of FIG. 10c, a wall member 86a forms brushing chambers 87a and 87c, and partly forms brushing chamber 87g, wherein edges 88a, 88b, 88c and 88d of the wall member 86a are fixed to an upper inner surface of the supporting structure 85. A wall member 86b forms brushing chambers 87d and 87f, and partly forms brushing chamber 87g, wherein edges 88e, 88f, 88g and 88h of the wall member 86b are fixed to a lower inner surface of the supporting structure 85. The brushing chambers 87a, 87c, 87d, 87f and 87g comprise flexible wall parts 89a to 89f, respectively.

The embodiment of the mouthpiece 81c of FIG. 10d differs from the embodiment of FIG. 10b in that a central part 85a of the supporting structure as shown in FIG. 10b has been removed entirely in the embodiment of FIG. 10d, and the edges 88b and 88f, as well as the edges 88c and 88g are interconnected, respectively. Like in FIG. 10c, brushing chambers 87*b* and 87*e* as shown in FIG. 10*b* are combined into brushing chamber 87*g* according to FIG. 10*d*.

In the embodiment of FIG. 10*d*, a wall member 86*c* forms brushing chambers 87*a*, 87*c*, 87*d*, 87*f* and 87*g*, wherein edges 88*a* to 88*h* of the wall member 86*c* are fixed to an inner surface of the supporting structure 85. The brushing chambers 87*a*, 87*c*, 87*d*, 87*f* and 87*g* comprise flexible wall parts 89*a* to 89*f*, respectively.

In alternative embodiments of FIGS. 10*a* to 10*d*, the supporting structure 84, 85, at the inner surface thereof, may comprise one or more recesses over which the wall member 82, 86*a*, 86*b*, 86*c* is fixed, wherein the wall member comprises a flexible wall part 83, 89*a* to 89*f*.

FIGS. 11, 12 and 13 show embodiments of tubular members forming positioning chambers or brushing chambers. The tubular members are made of elongate strips having longitudinal edges. The strips are interconnected along their longitudinal edges.

FIG. 11 illustrates a positioning chamber or brushing chamber 90 being formed by an elongated strip 92 having edges or edge regions 92*a*, 92*b* connected to each other by gluing, welding or any other suitable method. The strip 92 is connected to a supporting structure 94, whereby the positioning chamber or brushing chamber 90 is connected to the supporting structure 94. The positioning chamber or brushing chamber 90 comprises a flexible wall part 96 which is to be provided with bristles extending outwardly from the flexible wall part 96.

FIG. 12 illustrates a positioning chamber or brushing chamber 100 being formed by elongated strips 102*a*, 102*b* having edges or edge regions 104*a*, 104*b* connected to each other by gluing, welding or any other suitable method. The strip 102*a* is connected to an inner surface of the supporting structure 106, whereby the positioning chamber or brushing chamber 100 is connected to the supporting structure 106. The positioning chamber or brushing chamber 100 comprises a flexible wall part 108 of the strip 102*b* which is to be provided with bristles extending outwardly from the flexible wall part 108. The strip 102*a* connected to the supporting structure 106 may be relatively rigid with respect to the strip 102*b*, at least the flexible wall part 108 thereof.

FIG. 13 illustrates a positioning chamber or brushing chamber 110 being formed by two elongated strips 112*a*, 112*b* having edges or edge regions 114*a*, 114*b* connected to each other by gluing, welding or any other suitable method. The strip 112*a* is connected to an inner surface of the supporting structure 116, whereby the positioning chamber or brushing chamber 110 is connected to the supporting structure 116. The positioning chamber or brushing chamber 110 comprises a flexible wall part 118 of the strip 112*b* which is to be provided with bristles extending outwardly from the flexible wall part 118. The strip 112*a* connected to the supporting structure 116 may be relatively rigid compared to the strip 112*b*, at least the flexible wall part 118 thereof.

In the embodiments of the mouthpiece according to FIGS. 1 to 13 the at least one brushing chamber is configured to face at least one of a lingual surface, facial surface, and occlusal surface or incisal edge of the dental arch, and the bristles are configured to engage at least one of the lingual surface, facial surface, and occlusal surface or incisal edge of the dental arch when the chamber is pressurized.

In the embodiments of the mouthpiece according to FIGS. 1, 2*a* to 2*c*, 3, 4*a* to 4*c*, 7*a* to 7*d*, 9, 10*b* to 10*d*, the supporting structure comprises three brushing chambers per dental arch, wherein a first brushing chamber of the three brushing chambers is configured to face the lingual surface of the dental arch, a second brushing chamber of the three brushing chambers is configured to face the facial surface of the dental arch, and a third brushing chamber of the three brushing chambers is configured to face the occlusal surface or incisal edge of the dental arch, and wherein the bristles are configured to contact at least one of the lingual surface, facial surface, and occlusal surface or incisal edge of the dental arch when the corresponding first, second or third brushing chamber is pressurized.

In the embodiments of the mouthpiece according to FIGS. 7*a* to 7*d*, a part of the supporting structure that encompasses an incisor comprises at least two brushing chambers per dental arch, wherein a first brushing chamber of the two brushing chambers is configured to face the lingual surface of the incisor, and a second brushing chamber of the two brushing chambers is configured to face the facial surface of the incisor, and wherein the bristles are configured to contact at least one of the lingual surface and facial surface of the incisor when the corresponding first or second brushing chamber is pressurized.

FIG. 14 illustrates a flexible wall part 120 and bristles 122 of tufts of bristles that are integrally made from the same material, for example by coextruding.

FIG. 15 illustrates a flexible wall part or bristle support 130 in which bristles 132 or tufts of bristles are fixed to the flexible wall part of a brushing chamber or to the bristle support by insert moulding. The bristle support can lie against, or be adhered to, or be fixed to a flexible wall part of a brushing chamber.

FIG. 15*a* schematically depicts a top view of an embodiment of a bristle support 134 having bristles 136 implanted therein. The bristle support 134 can lie against, or be adhered to, or be fixed to a flexible wall part of a brushing chamber. The bristle support 134 can have a net-shaped configuration, as shown in FIG. 15*a*, or any other configuration.

FIG. 16 illustrates fixing a tuft of bristles 142 in a hole 144 of a flexible wall part or bristle support 140 by cramming.

FIG. 17*a* illustrates fixing a tuft of bristles 152 in a hole 153 of a flexible wall part or bristle support 150 by applying an adhesive 151. FIG. 17*b* illustrates fixing a tuft of bristles 156 in a hole 157 of a bristle support 158 provided on a flexible wall part 154 by applying an adhesive 155.

Figure 18:
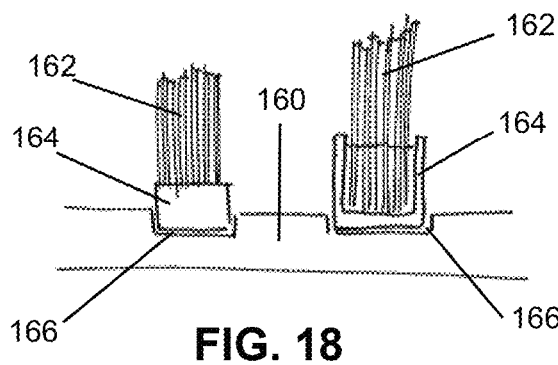
FIG. 18 schematically depicts, partially in cross-sectional view, a flexible wall part of a brushing chamber, the flexible wall part having recesses for accommodating a bristle support.

FIG. 18 illustrates fixing a tuft of bristles 162 on a bristle support 164. The bristle support 164 is adhered to, or fixed in a recess 166 of a flexible wall part 160 of a brushing chamber.

Figure 19:
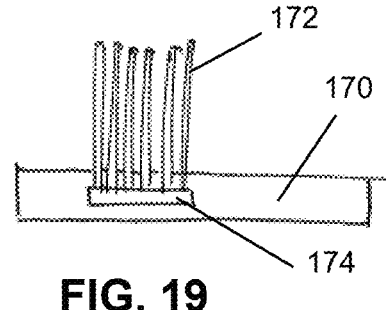
FIG. 19 schematically depicts, partially in cross-sectional view, a flexible wall part of a brushing chamber, the flexible wall part having a bristle support embedded therein.

FIG. 19 illustrates fixing a tuft of bristles 172 on a bristle support 174. The bristle support 174 is embedded in a flexible wall part 170 of a brushing chamber.

Figure 20:
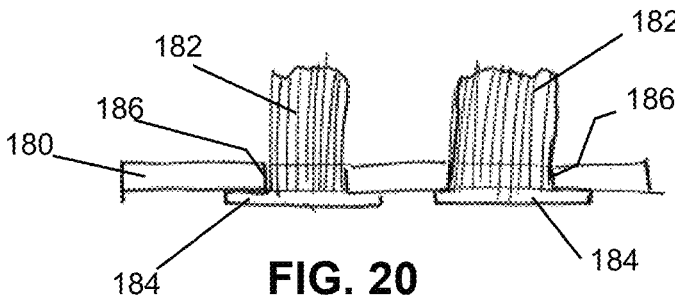
FIG. 20 schematically depicts, partially in cross-sectional view, a flexible wall part of a brushing chamber, the flexible wall part comprising through holes for accommodating tufts of bristles pre-bundled on a bristle support.

FIG. 20 illustrates fixing tufts of bristles 182 on a bristle support 184. The bristle supports 184 are fixed to a side of a flexible wall part 180 of a brushing chamber, in particular at an inner side of the brushing chamber. The tufts of bristles 182 protrude through respective holes 186 of the flexible wall part 180. The bristle supports 184 overlap the holes 186.

Figure 21:
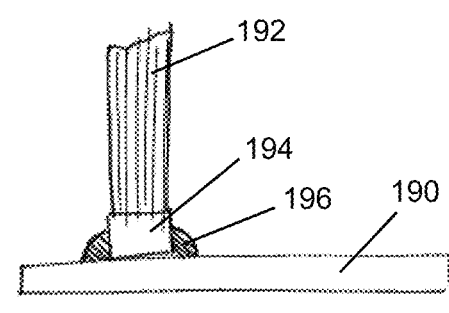
FIG. 21 schematically depicts, partially in cross-sectional view, a flexible wall part of a brushing chamber, a bristle support being glued to the outer surface of the flexible wall part.

FIG. 21 illustrates fixing a tuft of bristles 192 on a bristle support 194. The bristle support 194 is glued on a flexible wall part 190 of a brushing chamber by an adhesive 196.

Figure 22:
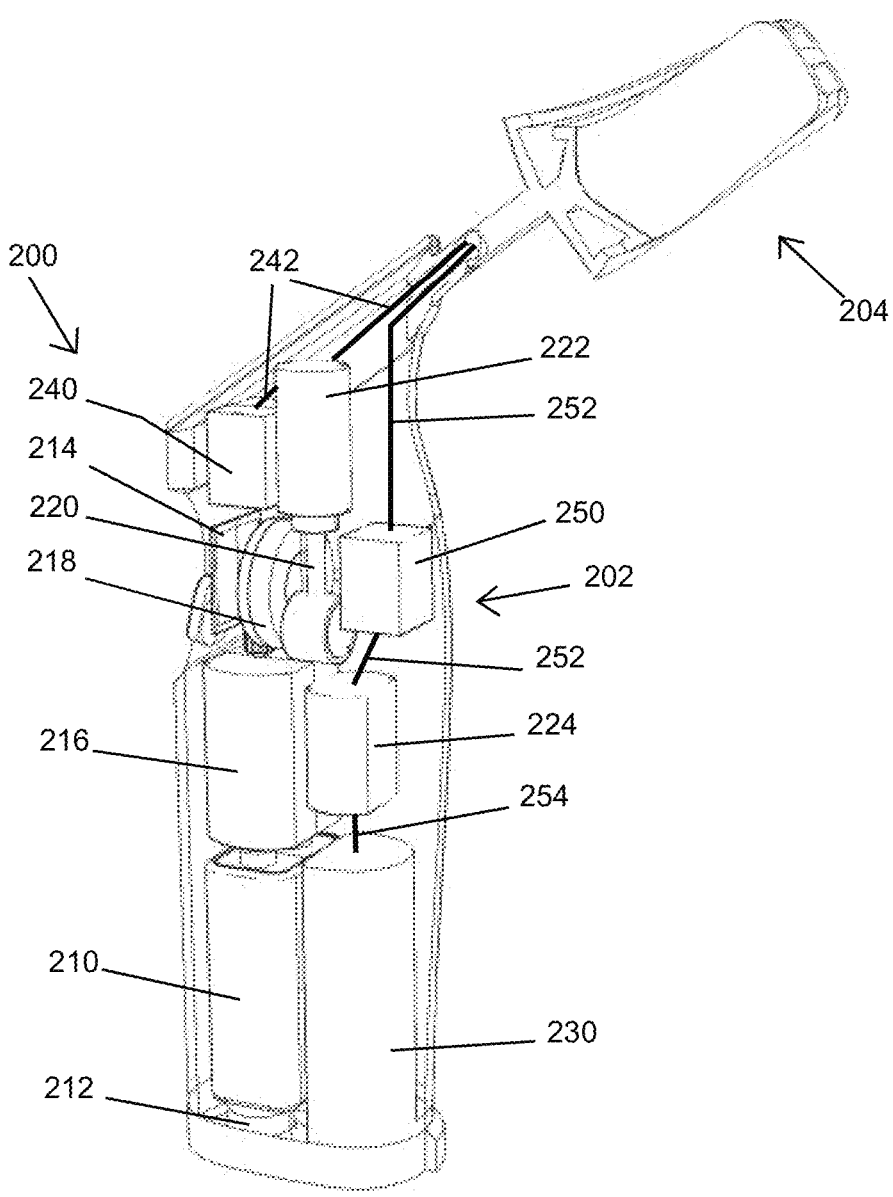
FIG. 22 schematically depicts, in a partially cut-away perspective view, a dental cleaning device comprising a handle member and a mouthpiece coupled thereto.

FIG. 22 schematically depicts, in a partially cut-away perspective view, a dental cleaning device 200 comprising a handle member 202 and a mouthpiece 204 coupled thereto. The handle member 202 is provided with a handle interface, and the mouthpiece 204 is provided with a mouthpiece interface configured to be detachably coupled to the handle interface. The handle member 200 comprises a battery 210 for storing electrical energy which can be fed to the battery 210 through a battery charging interface 212. The battery 210 provides energy to a printed circuit board, PCB, 214, to a main pumping unit comprising a motor 216, a transmission 218, a crank piston 220 and a piston pump 222, and to a mouthwash pump 224. A mouthwash capsule 230 containing a mouthwash liquid is removably accommodated in the handle member 200. The piston pump 222 may be a pneumatic pump. The mouthwash pump 224 may be a hydraulic pump.

A brushing valve unit 240 is included in one or more ducts 242 leading from the piston pump 222 to the mouthpiece 204, and in possible other ducts. A cleaning valve unit 250 is included in a duct 252 leading from the mouthwash pump 224 to the mouthpiece 204. The brushing valve unit 240 and the cleaning valve unit 250 comprise electronic valves which also receive energy from the battery 210. The mouthwash pump 224 is in fluid communication with the mouthwash capsule 230 through a duct 254.

The operation of the dental cleaning device 200 is controlled by the PCB 214. The PCB 214 may control the operation of the motor 216, the operation of the mouthwash pump 224, and the operation of valves comprised in the brushing valve unit 240 and in the cleaning valve unit 250. In particular, when the dental cleaning device is used for brushing teeth, wherein a plurality of teeth of a dental arch is encompassed by the mouthpiece 204, the PCB 214 may control the dental cleaning device 200 to alternatingly pressurizing and depressurizing at least one brushing chamber provided at the inner surface side of the supporting structure of the mouthpiece 204. If at least two adjacent brushing chambers are provided at the inner surface side of the supporting structure of the mouthpiece 204, wherein the respective flexible wall parts of the two brushing chambers are adjacent to each other and face adjacent parts of the same tooth surface, the PCB 214 may control the dental cleaning device 200 to repeat a brushing cycle comprising (a) pressurizing one of the two brushing chambers while depressurizing the other one of the two brushing chambers, and (b) depressurizing said one of the two brushing chambers while pressurizing said other one of the two brushing chambers. If a positioning chamber is located between the inner surface of the supporting structure of the mouthpiece 204 and the at least one brushing chamber of the mouthpiece 204, the PCB 214 may control the dental cleaning device 200 to depressurize the positioning chamber before encompassing the set of teeth by the mouthpiece, to pressurize the positioning chamber after encompassing the plurality of teeth; and to maintain the positioning chamber pressurized while pressurizing and depressurizing the at least one brushing chamber of the mouthpiece 204.

Figures 23, 24, 25:
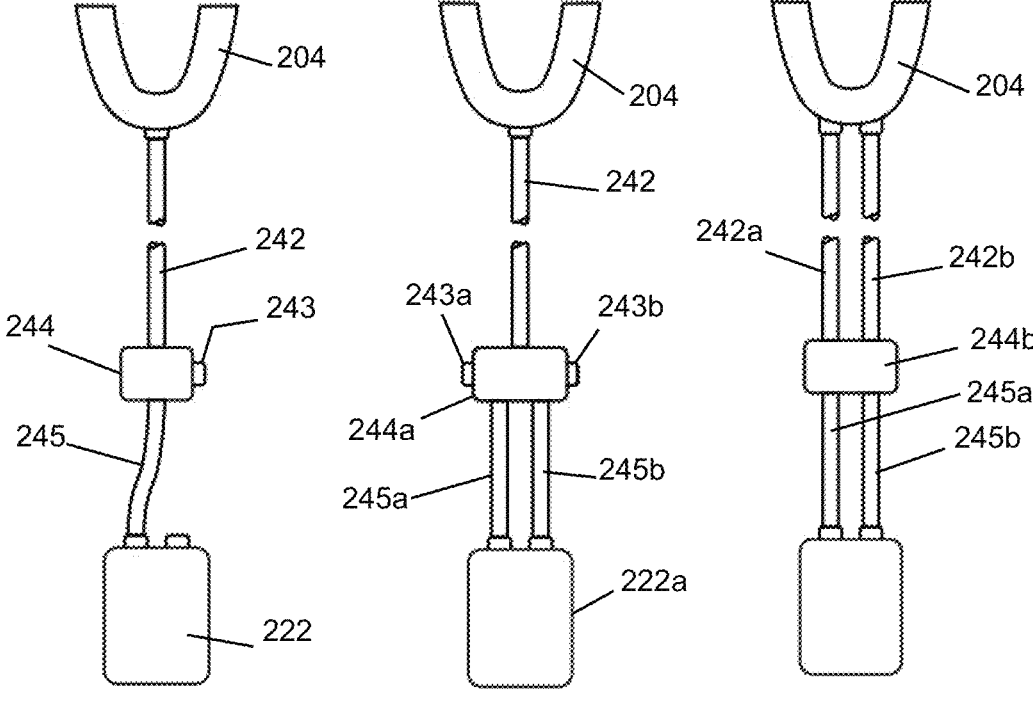
FIG. 23 schematically depicts a first embodiment of a fluid pressurizing and depressurizing device coupled to (in fluid communication with) a mouthpiece.
FIG. 24 schematically depicts a second embodiment of a fluid pressurizing and depressurizing device coupled to (in fluid communication with) a mouthpiece.
FIG. 25 schematically depicts a third embodiment of a fluid pressurizing and depressurizing device coupled to (in fluid communication with) a mouthpiece.

FIG. 23 schematically depicts a first embodiment of a fluid pressurizing and depressurizing device coupled to (in fluid communication with) a mouthpiece. The pressurizing and depressurizing device of FIG. 23 comprises a pump 222 in fluid communication with an electronic valve 244 through duct 245. The pump 222 may be a piston pump or another type of pump. The electronic valve 244 is in fluid communication with the mouthpiece 204 through duct 242 to control a pressurizing or depressurizing of a positioning chamber or a brushing chamber of the mouthpiece 204. The electronic valve 244 may be a three-way valve controllable by the PCB 214.

The pump 222 may build up an overpressure (i.e., a pressure higher than an environmental pressure) such as an air pressure, in duct 245. Then, the electronic valve 244 may open to provide a fluid connection from duct 245 to duct 242 to pressurize duct 242 and to thereby pressurize the brushing chamber(s) or positioning chamber(s) being in fluid communication with the duct 242. After some time, the electronic valve 244 may be closed again to disconnect duct 242 from duct 245. Then, the electronic valve 244 may further provide a fluid connection from duct 242 to the environment through opening 243, whereby the duct 242 and the brushing chamber(s) or positioning chamber(s) being in fluid communication with the duct 242 are depressurized to environmental pressure.

It is also possible for (another embodiment of) the pump 222 to build up an underpressure (i.e., a pressure lower than an environmental pressure) such as an air pressure, in duct 245. Then, the electronic valve 244 may open to provide a fluid connection from duct 245 to duct 242 to depressurize duct 242 and to thereby depressurize the brushing chamber(s) or positioning chamber(s) being in fluid communication with the duct 242. After some time, the electronic valve 244 may be closed again to disconnect duct 242 from duct 245. Then, the electronic valve 244 may further provide a fluid connection from duct 242 to the environment through opening 243, whereby the duct 242 and the brushing chamber(s) or positioning chamber(s) being in fluid communication with the duct 242 are pressurized to environmental pressure.

FIG. 24 schematically depicts a second embodiment of a fluid pressurizing and depressurizing device coupled to (in fluid communication with) a mouthpiece. The pressurizing and depressurizing device of FIG. 24 comprises a pump 222a in fluid communication with an electronic valve 244a through ducts 245a, 245b. The pump 222a may be a piston pump or another type of pump. The electronic valve 244a is in fluid communication with the mouthpiece 204 through duct 242 to control a pressurizing or depressurizing of a positioning chamber or a brushing chamber of the mouthpiece 204. The electronic valve 244a may be a five-way valve controllable by the PCB 214.

In the embodiment of FIG. 24, the pump 222a may build up an overpressure (i.e., a pressure higher than an environmental pressure) such as an air pressure, in duct 245a. Then, the electronic valve 244a may open to provide a fluid connection from duct 245a to duct 242 to pressurize duct 242 and to thereby pressurize the brushing chamber(s) or positioning chamber(s) being in fluid communication with the duct 242. After some time, the electronic valve 244a may be closed again to disconnect duct 242 from duct 245a. Then, the electronic valve 244a may further provide a fluid connection from duct 242 to the environment through opening 243a, whereby the duct 242 and the brushing chamber(s) or positioning chamber(s) being in fluid communication with the duct 242 are depressurized to environmental pressure.

The pump 222a may further build up an under-pressure (i.e., a pressure lower than an environmental pressure) such as an air pressure, in duct 245b. Then, the electronic valve 244a may open to provide a fluid connection from duct 245b to duct 242 to pressurize duct 242 and to thereby pressurize the brushing chamber(s) or positioning chamber(s) being in fluid communication with the duct 242. After some time, the electronic valve 244a may be closed again to disconnect duct 242 from duct 245b. Then, the electronic valve 244a may further provide a fluid connection from duct 242 to the environment through opening 243b, whereby the duct 242 and the brushing chamber(s) or positioning chamber(s) being in fluid communication with the duct 242 are depressurized to environmental pressure.

In an alternative embodiment, the pump 222a may be configured to create the overpressure in duct 245b, and the underpressure in duct 245a.

FIG. 25 schematically depicts a third embodiment of a fluid pressurizing and depressurizing device coupled to (in fluid communication with) a mouthpiece. The pressurizing and depressurizing device of FIG. 25 comprises a pump 222*b* in fluid communication with an electronic valve 244*b* through ducts 245*a*, 245*b*. The pump 222*b* may be a piston pump or another type of pump. The electronic valve 244*b* is in fluid communication with the mouthpiece 204 through ducts 242*a*, 242*b* to control a pressurizing or depressurizing of a positioning chamber and a brushing chamber, or two positioning chambers, or two brushing chambers of the mouthpiece 204. The electronic valve 244*b* is a four-way valve controllable by the PCB 214.

In the embodiment of FIG. 25, the pump 222*b* may build up an overpressure (i.e., a pressure higher than an environmental pressure) such as an air pressure, in duct 245*a*. Then, the electronic valve 244*a* may open to provide a fluid connection from duct 245*a* to duct 242*a* to pressurize duct 242*a* and to thereby pressurize the brushing chamber(s) or positioning chamber(s) being in fluid communication with the duct 242*a*. The electronic valve 244*a* may further open to provide a fluid connection from duct 245*b* to duct 242*b* to depressurize duct 242*b* and to thereby depressurize the brushing chamber(s) or positioning chamber(s) being in fluid communication with the duct 242*b*. After some time, the electronic valve 244*b* may be closed again to disconnect ducts 242*a*, 242*b* from ducts 245*a*, 245*b*. Then, the electronic valve 244*a* may open to provide a fluid connection from duct 245*a* to duct 242*b* to pressurize duct 242*b* and to thereby pressurize the brushing chamber(s) or positioning chamber(s) being in fluid communication with the duct 242*b*. The electronic valve 244*a* may further open to provide a fluid connection from duct 245*b* to duct 242*a* to depressurize duct 242*a* and to thereby depressurize the brushing chamber(s) or positioning chamber(s) being in fluid communication with the duct 242*a*. After some time, the electronic valve 244*b* may be closed again to disconnect ducts 242*a*, 242*b* from ducts 245*a*, 245*b*. Thus, the ducts 242*a*, 242*b* are pressurized and depressurized alternatingly.

Figure 26:
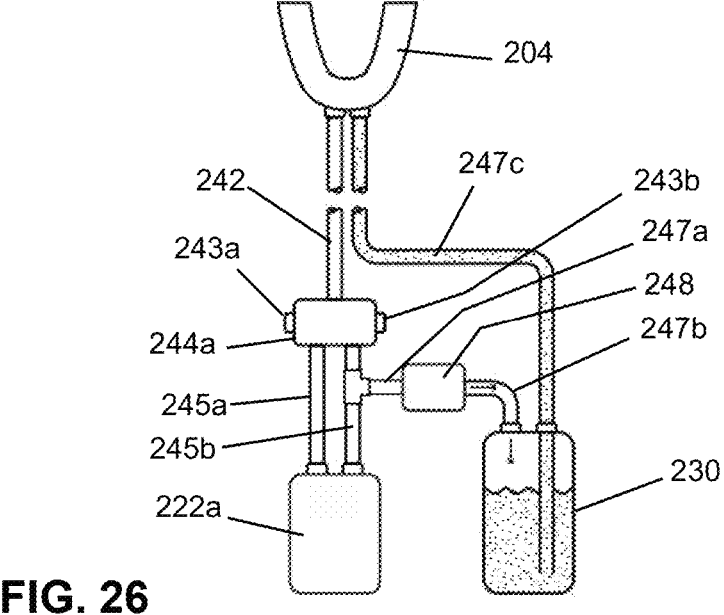
FIG. 26 schematically depicts a fourth embodiment of a fluid pressurizing and depressurizing device coupled to (in fluid communication with) a mouthpiece.

FIG. 26 schematically depicts a fourth embodiment of a fluid pressurizing and depressurizing device coupled to (in fluid communication with) a mouthpiece. The pressurizing and depressurizing device of FIG. 26, like the embodiment of FIG. 24, comprises a pump 222*a* in fluid communication with an electronic valve 244*a* through ducts 245*a*, 245*b*. The electronic valve 244*a* is in fluid communication with the mouthpiece 204 through duct 242 to control a pressurizing or depressurizing of a positioning chamber or a brushing chamber of the mouthpiece 204. The electronic valve 244*a* is a five-way valve controllable by the PCB 214. From the duct 245*b*, a branch duct 247*a* is provided leading to a mouthwash valve 248. The mouthwash valve 248 is in fluid communication with the mouthwash capsule 230 through duct 247*b* to allow high pressure air from the pump 222*a* to pump mouthwash liquid from the mouthwash capsule 230 through duct 247*c* to the mouthpiece 204.

Figure 27:
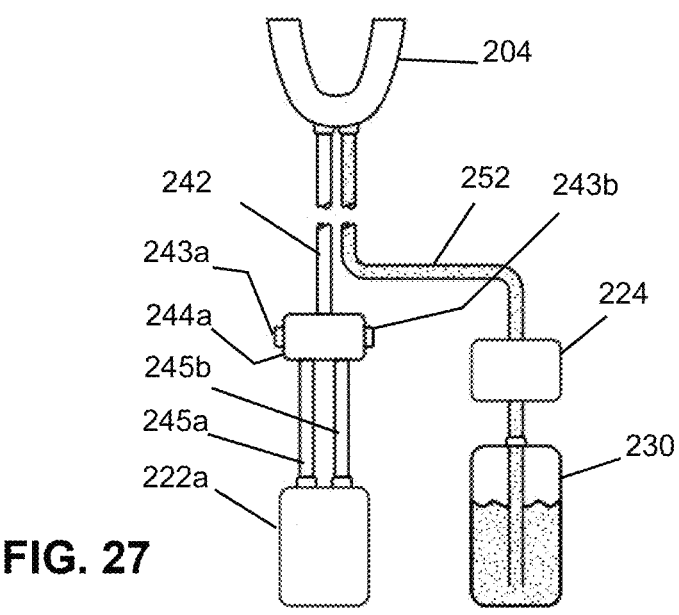
FIG. 27 schematically depicts a fifth embodiment of a fluid pressurizing and depressurizing device coupled to (in fluid communication with) a mouthpiece.

FIG. 27 schematically depicts a fifth embodiment of a fluid pressurizing and depressurizing device coupled to (in fluid communication with) a mouthpiece. The pressurizing and depressurizing device of FIG. 27, like the embodiment of FIG. 24, comprises a pump 222*a* in fluid communication with an electronic valve 244*a* through ducts 245*a*, 245*b*. The electronic valve 244*a* is in fluid communication with the mouthpiece 204 through duct 242 to control a pressurizing or depressurizing of a positioning chamber or a brushing chamber of the mouthpiece 204. The electronic valve 244*a* is a five-way valve controllable by the PCB 214. The mouthwash pump 224, when controlled to do so by PCB 214, pumps mouthwash liquid from the mouthwash capsule 230 to the mouthpiece 204 through duct 252.

Figures 28A, 28B, 29A, 29B, 30A, 30B:
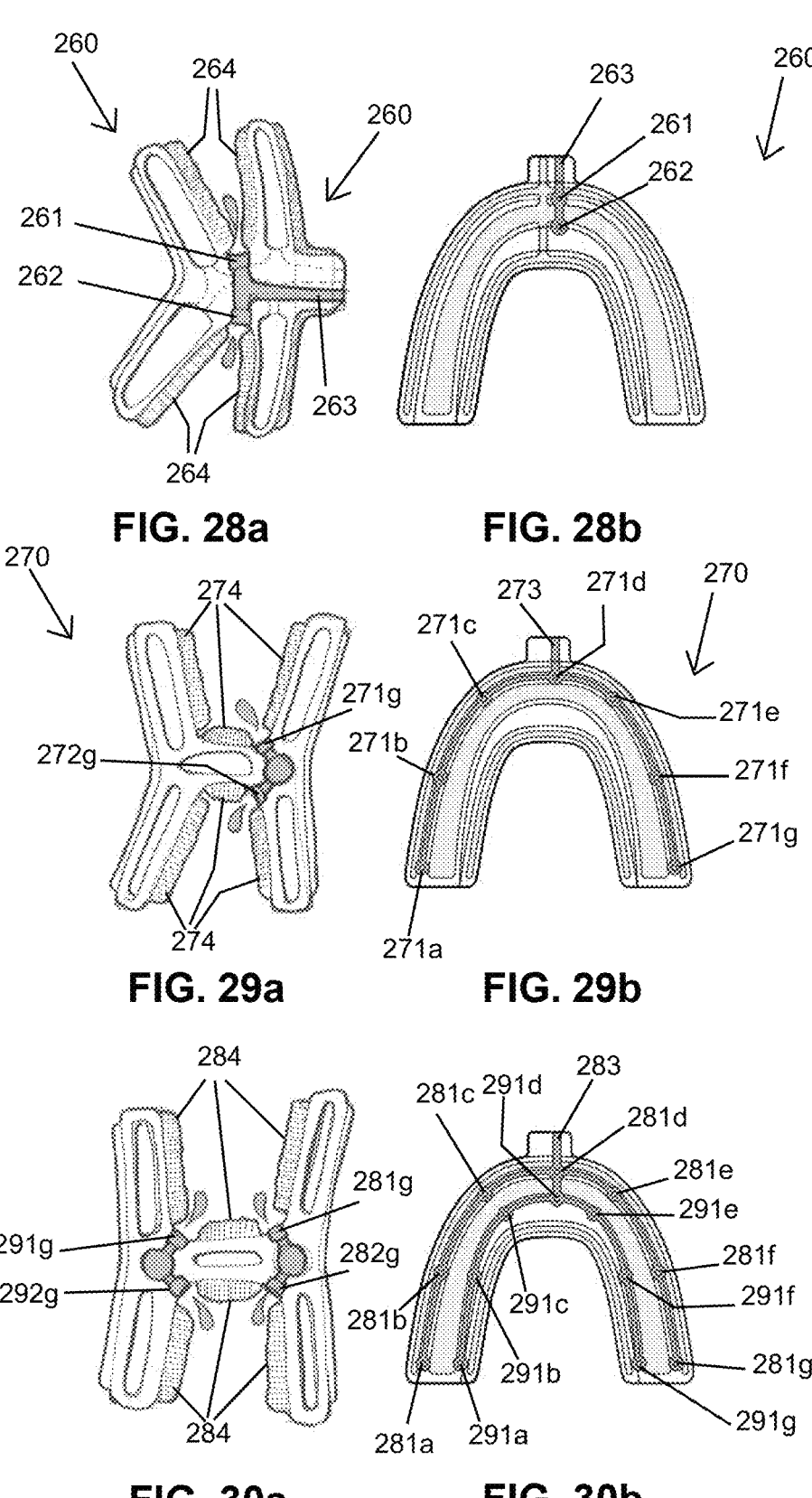

FIGS. 28*a* and 28*b* schematically depict, in a cross-sectional view and a top view, respectively, a first embodiment of a cleaning fluid arrangement in a mouthpiece 260. The first embodiment of the cleaning fluid arrangement is configured to provide a dental cleaning fluid in a region of the incisors of the plurality of teeth, and comprises a first outlet 261 configured to supply the dental cleaning fluid to the region of the incisors of the maxillary dental arch and a second outlet 262 configured to supply the dental cleaning fluid to the region of the incisors of the mandibular dental arch. The dental cleaning fluid is supplied through a duct 263 to the first and second outlets 261, 262 close to bristles 264 so that the dental cleaning fluid can be distributed by the bristles 264 across tooth surfaces.

FIGS. 29*a* and 29*b* schematically depict, in a cross-sectional view and a top view, respectively, a second embodiment of a cleaning fluid arrangement in a mouthpiece 270. The second embodiment of the cleaning fluid arrangement is configured to supply a dental cleaning fluid in a region of the maxillary dental arch through first outlets 271*a*, 271*b*, 271*c*, 271*d*, 271*e*, 271*f* and 271*g*, and additional second outlets 272*a* to 272*g* (only outlet 272*g* being visible in FIG. 29*a*) to supply the dental cleaning fluid in a region of the mandibular dental arch. The dental cleaning fluid is supplied through a duct 273 to the first and second outlets 271*a* to 271*g*, 272*a* to 272*g* close to bristles 274 so that the dental cleaning fluid can be distributed by the bristles 274 across tooth surfaces.

FIGS. 30*a* and 30*b* schematically depict, in a cross-sectional view and a top view, respectively, a third embodiment of a cleaning fluid arrangement in a mouthpiece 280. The third embodiment of the cleaning fluid arrangement is configured to supply a dental cleaning fluid in a region of the maxillary dental arch through first outlets 281*a*, 281*b*, 281*c*, 281*d*, 281*e*, 281*f* and 281*g*, 291*a*, 291*b*, 291*c*, 291*d*, 291*e*, 291*f* and 291*g*, and additional second outlets 282*a* to 282*g*, 292*a* to 292*g* (only outlets 282*g* and 292*g* being visible in FIG. 30*a*) to supply the dental cleaning fluid in a region of the mandibular dental arch. The dental cleaning fluid is supplied through a duct 283 to the first and second outlets 281*a* to 281*g*, 291*a* to 291*g*, 282*a* to 282*g*, 292*a* to 292*g* close to bristles 284 so that the dental cleaning fluid can be distributed by the bristles 284 across tooth surfaces.

The next following clauses give examples of the above-described inventions and further aspects and embodiments of these inventions:

1 ] A mouthpiece, comprising:
  a supporting structure configured to encompass a plurality of teeth of a dental arch, the supporting structure having an inner surface configured to face a tooth surface;
  at least one brushing chamber provided at the inner surface side of the supporting structure, wherein the at least one brushing chamber comprises a flexible wall part, wherein the flexible wall part is deformable by pressurizing or depressurizing the brushing chamber; and
  bristles extending externally from the flexible wall part of the brushing chamber.

2] A mouthpiece for encompassing a plurality of teeth to be brushed in an upper and lower dental arch,
  wherein the upper and lower dental arch each have a teeth surface comprising:
    a lingual surface,
    a facial surface, and occlusal surface and incisal edge;

the lingual surface facing a tongue, the facial surface facing a face and the occlusal surface and incisal edge of the upper dental arch facing the occlusal surface respectively incisal edge of the lower dental arch;

wherein the mouthpiece comprises a support structure configured to encompass a plurality of teeth of the dental arch and having an inner surface configured to face the teeth surface of the teeth to be brushed;

wherein the mouthpiece furthermore comprises at least one brushing chamber provided at the side of the inner surface of the supporting structure;

wherein the at least one brushing chamber comprises a flexible wall part, the flexible wall part having an outer side facing away from the brushing chamber, the at least one brushing chamber being configured to face with the outer side of its flexible wall part: the lingual surface and the facial surface and occlusal surface and incisal edge of the teeth to be brushed in the upper and lower dental arch;

wherein the mouthpiece furthermore comprises bristles provided on and extending from the outer side of the flexible wall part to the teeth surface;

wherein the flexible wall part of the at least one brushing chamber is configured to be deformable by alternatingly pressurizing and depressurizing a fluid in the at least one brushing chamber.

3] The mouthpiece according to any one of the preceding clauses, wherein the brushing chamber is provided with an opening configured to allow supply of a fluid into the brushing chamber, and discharge of the fluid from the brushing chamber for pressurizing and depressurizing the brushing chamber, respectively.

4] The mouthpiece according to any one of the preceding clauses, wherein the mouthpiece is configured for the bristles to engage the tooth surface at least when the brushing chamber is pressurized.

5] The mouthpiece according to any one of the preceding clauses, wherein the flexible wall part is made from an elastic material, such as a rubber material.

6] The mouthpiece according to any one of the preceding clauses, wherein the at least one brushing chamber comprises a tubular member fixed to the inner surface of the supporting structure, wherein the tubular member comprises the flexible wall part provided with the bristles.

7] The mouthpiece according to clause 6, wherein the tubular member is made of elongate strips have longitudinal edges, wherein the strips are interconnected along their longitudinal edges.

8] The mouthpiece according to clause 7, wherein the tubular member is made of two elongate strips, wherein a first strip is fixed to the inner surface of the supporting structure, and wherein a second strip comprises the flexible wall part provided with the bristles.

9] The mouthpiece according to any one of clauses 6 to 8, wherein the supporting structure, at the inner surface thereof, comprises a recess to accommodate at least part of the tubular member.

10] The mouthpiece according to any one of clauses 1 to 5, wherein the at least one brushing chamber comprises a wall member having an edge, wherein the edge is fixed to the inner surface of the supporting structure, and wherein the wall member comprises the flexible wall part provided with the bristles.

11] The mouthpiece according to clause 10, wherein the supporting structure, at the inner surface thereof, comprises a recess over which the wall member is fixed.

12] The mouthpiece according to any one of the preceding clauses, wherein the brushing chamber contains a bladder made from a flexible material, and wherein the flexible wall part is deformable by pressurizing or depressurizing the bladder.

13] The mouthpiece according to clause 12, wherein the bladder is provided with an opening configured to allow supply of a fluid into the bladder, and discharge of the fluid from the bladder for pressurizing and depressurizing the brushing chamber, respectively.

14] The mouthpiece according to any one of the preceding clauses, further comprising a positioning chamber located between the inner surface of the supporting structure and the brushing chamber, the positioning chamber being deformable by pressurizing or depressurizing the positioning chamber.

15] The mouthpiece according to any one of the preceding clauses, wherein the at least one brushing chamber is configured to face at least one of a lingual surface, facial surface, and occlusal surface or incisal edge of the dental arch, and wherein the bristles are configured to engage at least one of the lingual surface, facial surface, and occlusal surface or incisal edge of the dental arch when the chamber is pressurized.

16] The mouthpiece according to any one of the preceding clauses, wherein the supporting structure comprises three brushing chambers per dental arch, wherein a first brushing chamber of the three brushing chambers is configured to face the lingual surface of the dental arch, a second brushing chamber of the three brushing chambers is configured to face the facial surface of the dental arch, and a third brushing chamber of the three brushing chambers is configured to face the occlusal surface or incisal edge of the dental arch, and wherein the bristles are configured to contact at least one of the lingual surface, facial surface, and occlusal surface or incisal edge of the dental arch when the corresponding first, second or third brushing chamber is pressurized.

17] The mouthpiece according to any one of clauses 1 to 14, wherein a part of the supporting structure that encompasses an incisor comprises at least two brushing chambers per dental arch, wherein a first brushing chamber of the two brushing chambers is configured to face the lingual surface of the incisor, and a second brushing chamber of the two brushing chambers is configured to face the facial surface of the incisor, and wherein the bristles are configured to contact at least one of the lingual surface and facial surface of the incisor when the corresponding first or second brushing chamber is pressurized.

18] The mouthpiece according to any one of the preceding clauses, wherein the bristles or tufts of bristles are fixed to the flexible wall part of the chamber by insert moulding, cramming or gluing.

19] The mouthpiece according to any one of clauses 1 to 17, wherein the flexible wall part and the bristles or tufts of bristles are an integrally made from the same material.

20] The mouthpiece according to any one of clauses 1 to 18, wherein the bristles or tufts of bristles each are fixed on a bristle support, and wherein the bristle support lies against, or is fixed to the flexible wall part of the chamber.

21] The mouthpiece according to clause 20, wherein the bristle support lies in a recess of the flexible wall part, or is embedded in material of the flexible wall part, or is adhered or glued to the flexible wall part, or is positioned in the chamber and overlapping a hole in the flexible wall part through which the tufts of bristles extend externally from the flexible wall part.

22] The mouthpiece according to clause 20 or 21, wherein the bristle support has a net-shaped configuration.

23] The mouthpiece according to any one of the preceding clauses, wherein the supporting structure is made of a rigid material.

24] The mouthpiece according to any one of the preceding clauses, wherein at least a part of the cross-section of the supporting structure is U-shaped or V-shaped.

25] The mouthpiece according to any one of the preceding clauses, wherein the supporting structure is configured to encompass all teeth of a dental arch.

26] The mouthpiece according to any one of the preceding clauses, wherein the supporting structure is configured to encompass a plurality of teeth of the maxillary dental arch and a plurality of teeth of the mandibular dental arch.

27] The mouthpiece according to clause 26, wherein the supporting structure is configured to encompass all teeth of both the maxillary dental arch and mandibular dental arch.

28] The mouthpiece according to clause 26 or 27, wherein at least a part of the cross-section of the supporting structure is H-shaped or X-shaped.

29] The mouthpiece according to any one of the preceding clauses,
wherein the mouthpiece furthermore comprises at least one fluid opening in fluid communication with the at least one brushing chamber and configured to allow, alternatingly, supply of fluid to the at least one brushing chamber and discharge of fluid from the at least one brushing chamber for alternatingly pressurizing and depressurizing the fluid in the at least one the brushing chamber.

30] The mouthpiece according to any one of the preceding clauses, wherein the flexible wall part is made from an elastic material.

31] The mouthpiece according to any one of the preceding clauses,
wherein the bristles are directly connected to the flexible wall part of the at least one brushing chamber.

32] The mouthpiece according to any one of the preceding clauses,
wherein the bristles are directly connected to the flexible wall part of the at least one brushing chamber such that the longitudinal direction of each bristle or tuft of bristles is determined by an orientation of the portion of the flexible wall part to which the bristle or tuft of bristles is connected or attached.

33] The mouthpiece according to any one of the preceding clauses, wherein the bristles are configured to engage at least one of the lingual surface, facial surface, and occlusal surface or incisal edge of the upper or lower dental arch when the at least one brushing chamber is pressurized.

34] The mouthpiece according to any one of the preceding clauses,
wherein the at least one brushing chamber extends, viewed in the length direction of the upper and lower dental arch, all along the length of the support structure.

35] The mouthpiece according to any one of the preceding clauses,
wherein the at least one brushing chamber, in use when encompassing a plurality of teeth of an upper and lower dental arch and viewed in length direction of the upper and lower dental arch, is configured to extend along a left part, a front part and a right part of the upper and lower dental arch.

36] The mouthpiece according to any one of the preceding clauses, wherein the brushing chamber is configured to encompass at least the incisors, canines, and premolars of the upper and lower dental arch.

37] The mouthpiece according to any one of the preceding clauses,
wherein the support structure is rigid relative to the flexible wall part of the at least one brushing chamber.

38] The mouthpiece according to any one of the preceding clauses, wherein the mouthpiece is configured to pressurize one or more of said at least one pressure chamber whilst depressurizing one or more other of said at least one pressure chamber.

39] The mouthpiece according to any one of the preceding clauses, wherein the mouthpiece is configured to allow pressurizing one or more of said at least one pressure chamber whilst allowing depressurizing one or more other of said at least one pressure chamber.

40] A method of brushing teeth, comprising:
   encompassing a plurality of teeth to be brushed with a mouse piece according to one of the preceding clauses;
   alternatingly pressurizing and the pressurizing said at least one brushing chamber.

41] A method of brushing teeth, comprising:
   encompassing a plurality of teeth of a dental arch by a mouthpiece comprising a supporting structure having an inner surface facing a tooth surface;
   alternatingly pressurizing and depressurizing at least one brushing chamber provided at the inner surface side of the supporting structure, wherein the at least one brushing chamber comprises a flexible wall part with bristles extending externally from the flexible wall part of the brushing chamber.

42] The method according to clause 40 or 41, wherein at least two adjacent brushing chambers are provided at the inner surface side of the supporting structure, the respective flexible wall parts of the two brushing chambers being adjacent to each other and facing adjacent parts of the same tooth surface, the method comprising:
   repeating a brushing cycle comprising:
   pressurizing one of the two brushing chambers while depressurizing the other one of the two brushing chambers; and
   depressurizing said one of the two brushing chambers while pressurizing said other one of the two brushing chambers.

43] The method according to any one of clauses 40-42, wherein a positioning chamber is located between the inner surface of the supporting structure and the at least one brushing chamber, the method further comprising:
   depressurizing the positioning chamber before encompassing the plurality of teeth by the mouthpiece;
   pressurizing the positioning chamber after encompassing the plurality of teeth; and
   maintaining the positioning chamber pressurized while pressurizing and depressurizing the at least one brushing chamber.

44] The method according to any one of clauses 40-43, wherein the bristles engage the tooth surface when the corresponding brushing chamber is pressurized.

45] A dental cleaning device, comprising a mouthpiece according to any one of clauses 1 to 39.

46] A dental cleaning device, comprising a mouthpiece according to any one of clauses 1-39,
wherein the dental cleaning device further comprises a pressure device configured:
   to be in fluid communication with the at least one brushing chamber; and for alternatingly pressurizing and depressurizing the at least one brushing chamber with a fluid.

47] The dental cleaning device according to clause 45 or 46, comprising:

a handle member provided with a handle interface, wherein the mouthpiece is provided with a mouthpiece interface configured to be detachably coupled to the handle interface.

48] The dental cleaning device according to clause 47, wherein the mouthpiece interface comprises at least one mouthpiece fluid channel terminal being in fluid communication with the at least one brushing chamber of the mouthpiece through a mouthpiece fluid channel, and wherein the handle interface comprises at least one handle fluid channel terminal configured to be in fluid communication with the mouthpiece fluid channel terminal.

49] The dental cleaning device according to clause 48, wherein the handle member comprises a pumping device for pressurizing and depressurizing the at least one brushing chamber, wherein the pumping device is configured to be in fluid communication with the handle fluid channel terminal through at least one handle fluid channel.

50] The dental cleaning device according to clause 49, wherein the pumping device is a pneumatic or hydraulic pump.

51] The dental cleaning device according to clause 49 or 50, wherein the pumping device is coupled to the handle fluid channel terminal through a controllable valve system.

52] The dental cleaning device according to any one of clauses 45-51, wherein the mouthpiece interface comprises at least one further mouthpiece fluid channel terminal being in fluid communication with a cleaning fluid supply opening provided at the supporting structure, and wherein the handle interface comprises at least one further handle fluid channel terminal configured to be in fluid communication with the further mouthpiece fluid channel terminal.

53] The dental cleaning device according to any one of clauses 45-52, wherein the dental cleaning device further comprises an interface having a first interface part with at least one first fluid terminal in fluid communication with the at least one brushing chamber, and a second interface part with at least one second fluid terminal in fluid communication with the at least one pressure device; and wherein the first interface part and second interface part are configured for being detachably coupled to each other such that, in coupled condition, said at least one first fluid terminal is in fluid communication with said at least one second fluid terminal.

54] The dental cleaning device according to clause 53, wherein the number of said at least one first fluid terminals corresponds with the number of said at least one second fluid terminals.

55] The dental cleaning device according to any one of clauses 45-54, wherein the pressure device is furthermore configured to pressurize one or more of said at least one pressure chamber whilst depressurizing one or more other of said at least one pressure chamber.

56] The mouthpiece according to any one of the clauses 1-39, wherein the mouthpiece furthermore comprises a cleaning fluid arrangement, which cleaning fluid arrangement comprises:

an inlet for cleaning fluid, which inlet opening is arranged a mouthpiece interface configured to couple the mouthpiece to a handle member;

one or more outlets for cleaning fluid, which one or more outlets are configured to supply the dental cleaning fluid in a region of the maxillary and/or mandibular dental arch; and a duct extending through the mouthpiece and configured to provide a fluid connection between the inlet for cleaning fluid and the one or more outlets for cleaning fluid.

57] The mouthpiece according to clause 56, wherein said one or more outlets comprise an outlet arranged in the region of the incisors of the plurality of teeth.

58] The mouthpiece according to clause 56 or 57, wherein said one or more outlets comprise a plurality of outlets arranged distributed along the dental arch over the region of the occlusal surface and incisal edge of the plurality of teeth.

59] The mouthpiece according to any one of clauses 56-58, wherein said one or more outlets comprise a first row with a plurality of outlets distributed along the dental arch over the region of the occlusal surface and incisal edge of the plurality of teeth.

59] The mouthpiece according to clause 58, wherein said one or more outlets comprise a second row with a plurality of outlets distributed along the dental arch over the region of the occlusal surface and incisal edge of the plurality of teeth, wherein the second row is parallel to the first row.

60] The mouthpiece according to any one of clauses 1-39 or 56-59, wherein the flexible wall part of the at least one brushing chamber is configured to take a convex shape as a result of pressurizing the at least one brushing chamber.

61] The mouthpiece according to any one of clauses 1-39 or 56-60, wherein the flexible wall part of the at least one brushing chamber is configured to take a concave shape as a result of depressurizing the at least one brushing chamber.

62] A dental cleaning device, comprising the mouthpiece according to any of the clauses 56-59 and a handle member, wherein the handle member is provided with a mouthwash capsule and a handle member duct configured to provide a fluid connection between the mouthwash capsule and the inlet for cleaning fluid.

63] The dental cleaning device according to clause 60, wherein the handle furthermore comprises a pump configured for pumping mouthwash liquid from the capsule to the mouthpiece.

As explained in detail above, a mouthpiece for a dental cleaning device comprises a supporting structure configured to encompass a plurality of teeth of a dental arch. The supporting structure has an inner surface facing a tooth surface. At least one brushing chamber is provided at the inner surface side. The brushing chamber comprises a flexible wall part being deformable by pressurizing or depressurizing the brushing chamber. Bristles extend externally from the flexible wall part. In a method of brushing teeth, a plurality of teeth is encompassed by the mouthpiece, and the at least one brushing chamber is alternatingly pressurized and depressurized.

As explained in detail above, a mouthpiece according to the invention comprises at least one brushing chamber. The at least one brushing chamber may, according to the invention be two brushing chambers, one for the upper dental arch and one for the lower dental arch. The at least one brushing chamber may also be two, three, five or any other number of brushing chambers for the upper dental arch and two, three, five or any other number of brushing chambers for the lower dental arch. The preceding, assumes that each brushing chamber extends over the full length of the mouthpiece, but at least one brushing chamber encompasses with the scope of the claims also embodiments in which one or more rows of brushing chambers, each row extending in the length direction of the dental arch, comprise two or more brushing chambers in line with each other.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a"/"an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, although not necessarily directly.

What is claimed is:

1. A mouthpiece for brushing teeth, the mouthpiece comprising:

a support structure configured to receive a plurality of teeth of a dental arch, the support structure comprising a first inner surface facing the plurality of teeth;

a first positioning chamber located between the first brushing chamber and the first inner surface of the support structure, coupled to the first inner surface of the support structure, configured to pressurized and depressurized;

a first brushing chamber coupled to the first positioning chamber, the first brushing chamber comprising a flexible wall part, the flexible wall part having an outer side opposite the first inner surface of the support structure; and a plurality of bristles extending from the outer side of the flexible wall part of the first brushing chamber;

wherein the flexible wall part of the first brushing chamber is configured to be deformed by alternately pressurizing and depressurizing a fluid in the first brushing chamber.

2. The mouthpiece of claim 1 wherein:

the support structure comprises a first side part, a second side part, and an intermediate part connecting the first and second side parts, the first side part comprising the first inner surface and the second side part comprising a second inner surface;

a second positioning chamber is coupled to the second inner surface of the support structure;

a second brushing chamber is coupled to the first positioning chamber, the second brushing chamber comprising a flexible wall part, the flexible wall part having an outer side opposite the second inner surface of the support structure;

a second plurality of bristles extending from the outer side of the flexible wall part of the second brushing chamber; and the flexible wall part of the second brushing chamber is configured to be deformed by alternately pressurizing and depressurizing a fluid in the first brushing chamber.

* * * * *